US012756817B2

(12) United States Patent
Heo et al.

(10) Patent No.: US 12,756,817 B2
(45) Date of Patent: Oct. 6, 2026

(54) VIDEO ENCODING/DECODING METHOD AND APPARATUS USING BI-DIRECTIONAL INTRA PREDICTION MODE

(71) Applicants: Hyundai Motor Company, Seoul (KR); Kia Corporation, Seoul (KR)

(72) Inventors: Jin Heo, Yongin (KR); Seung Wook Park, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 28 days.

(21) Appl. No.: 18/678,287

(22) Filed: May 30, 2024

(65) Prior Publication Data

US 2024/0323347 A1 Sep. 26, 2024

Related U.S. Application Data

(63) Continuation of application No. PCT/KR2022/019542, filed on Dec. 2, 2022.

(30) Foreign Application Priority Data

Dec. 2, 2021 (KR) ........................ 10-2021-0171211
Dec. 1, 2022 (KR) ........................ 10-2022-0166149

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
CPC .. H04N 19/105; H04N 19/159; H04N 19/176; H04N 19/109; H04N 19/11; H04N 19/117; H04N 19/132; H04N 19/593; H04N 19/82; H04N 19/577
See application file for complete search history.

(56) References Cited

U.S. PATENT DOCUMENTS

2013/0301709 A1* 11/2013 Lim ..................... H04N 19/176 375/240.03
2018/0288413 A1* 10/2018 Filippov ................ H04N 19/50
2019/0110052 A1* 4/2019 Liu ...................... H04N 19/105
2019/0327481 A1 10/2019 Zhu
2021/0144365 A1 5/2021 Filippov et al.
2021/0211717 A1* 7/2021 Lee ...................... H04N 19/105
2021/0243447 A1* 8/2021 Li ....................... H04N 19/593
2022/0311999 A1 9/2022 Lee

FOREIGN PATENT DOCUMENTS

KR 10-1444667 B1 9/2014
KR 10-2019-0028324 A 3/2019
KR 10-2019-0062300 A 6/2019
KR 10-2021-0024113 A 3/2021

* cited by examiner

*Primary Examiner* — Francis Geroleo
(74) *Attorney, Agent, or Firm* — Fox Rothschild LLP

(57) ABSTRACT

A method for decoding a video includes generating second reference samples based on an intra-prediction mode of a current block and first reference samples. The method for decoding the video also includes generating prediction values of samples in the current block, by using values of the second reference samples and values of the first reference samples. The method for decoding the video further includes generating a prediction block of the current block, based on the prediction values of the samples in the current block.

18 Claims, 34 Drawing Sheets

VIDEO ENCODING/DECODING METHOD AND APPARATUS USING BI-DIRECTIONAL INTRA PREDICTION MODE

CROSS-REFERENCE TO RELATED APPLICATIONS

This application is a continuation of International Application No. PCT/KR2022/019542, filed on Dec. 2, 2022, which claims under 35 U.S.C. § 119(a) the benefit of Korean Patent Application No. 10-2021-0171211 filed on Dec. 2, 2021, and Korean Patent Application No. 10-2022-0166149 filed on Dec. 1, 2022, the entire contents of each of which are incorporated herein by reference.

BACKGROUND

(a) Technical Field

The present disclosure in some embodiments relates to a video encoding/decoding method and a video encoding/decoding apparatus using a bi-directional intra-prediction mode, more particularly, to the video encoding/decoding method and the video encoding/decoding apparatus for applying weighted values to two prediction samples derived based on an intra-prediction mode of a current block to generate a final prediction sample.

(b) Description of the Related Art

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

Intra prediction is a prediction technology that allows spatial references exclusively, where the current block that is about to be encoded is predicted by referencing the already reconstructed blocks around the current block. In intra prediction, if only uni-directional prediction is performed, the prediction accuracy is susceptible to be degraded. Therefore, bi-directional prediction or bi-prediction needs to be added to the intra prediction to improve the prediction accuracy.

SUMMARY

An object of the present disclosure is to provide a method and an apparatus for performing bi-directional intra prediction based on an intra-prediction mode of a current block.

Another object of the present disclosure is to provide a method and an apparatus for applying bi-directional intra prediction to various intra prediction methods.

Another object of the present disclosure is to provide a method and an apparatus for transmitting or parsing syntax for bi-directional intra prediction.

Another object of the present disclosure is to provide a method and an apparatus for improving video encoding/decoding efficiency.

Another object of the present disclosure is to provide a recording medium storing a bitstream generated by a video encoding/decoding method or a video encoding/decoding apparatus of the present disclosure.

Another object of the present disclosure is to provide a method and for transmitting a bitstream generated by a video encoding/decoding method or an apparatus of the present disclosure.

According to a present disclosure, a video decoding method comprising: generating second reference samples based on an intra-prediction mode of a current block and first reference samples, generating prediction values of samples in the current block, by using values of the second reference samples and values of the first reference samples, and generating a prediction block of the current block, based on the prediction values of the samples in the current block.

According to the present disclosure, a video encoding method comprising: generating second reference samples, based on an intra-prediction mode of a current block and first reference samples, generating prediction values of samples in the current block, by using values of the second reference samples and values of the first reference samples, and generating a prediction block of the current block, based on the prediction values of the samples in the current block.

In addition, according to the present disclosure, it is possible to provide a method of transmitting a bitstream generated by the video encoding method or apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus for performing bi-directional intra prediction based on the intra-prediction mode of the current block may be provided.

In addition, according to the present disclosure, the method and an apparatus for applying bi-directional intra prediction to various intra-prediction methods may be provided.

In addition, according to the present disclosure, the method and an apparatus for transmitting or parsing syntax for bi-directional intra prediction may be provided.

In addition, according to the present disclosure, the method and an apparatus for improving video encoding/decoding efficiency may be provided.

The effects that may be obtained from the present disclosure are not limited to the effects mentioned above, and other effects not mentioned may be clearly understood by those having ordinary skill in the art from the description below.

DETAILED DESCRIPTION

Figure 1:
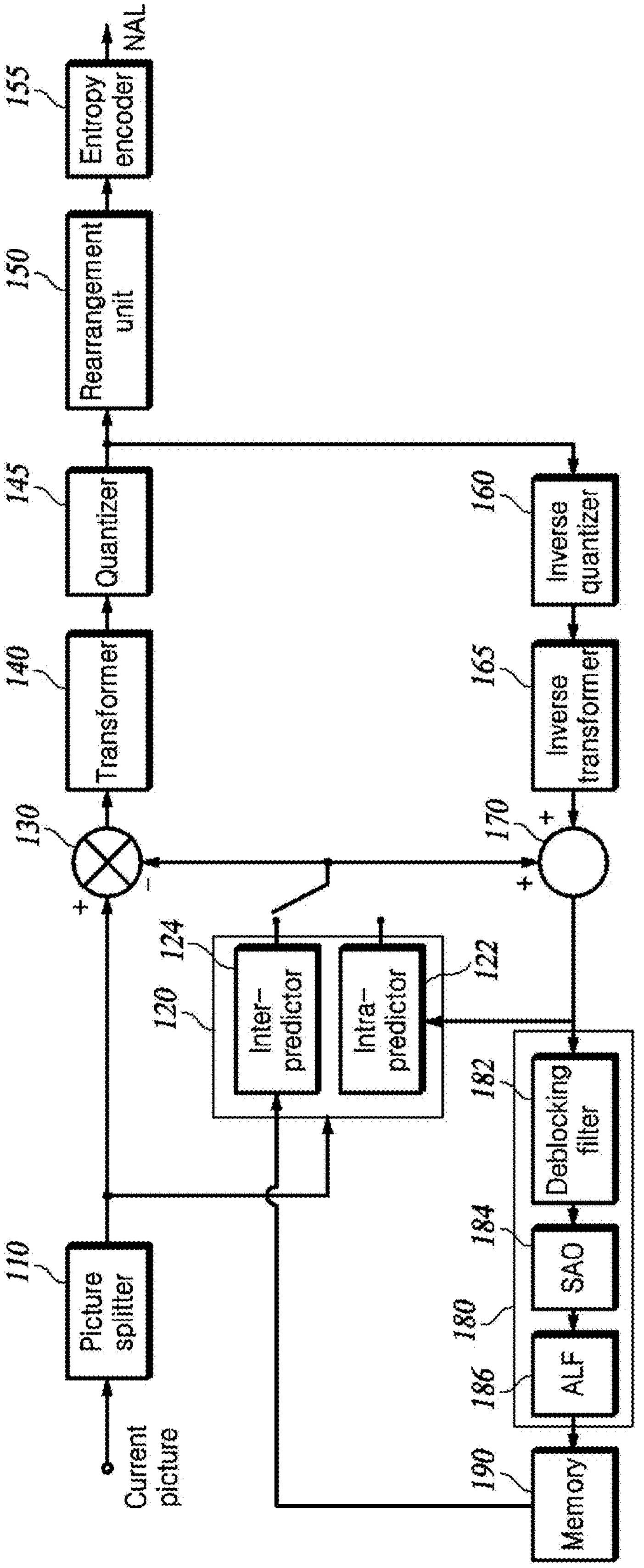
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a BTTT is added to the tree structures to be referred to as a multiple-type tree (MTT).

Figure 2:
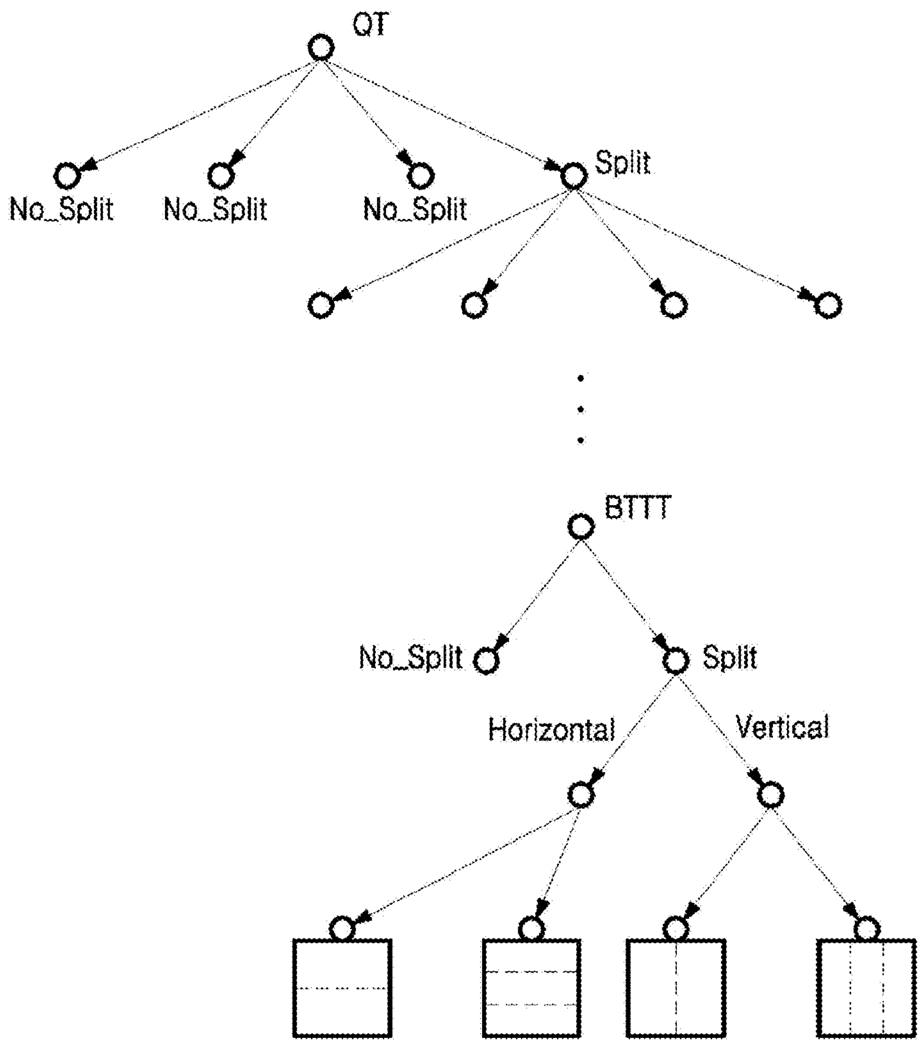
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
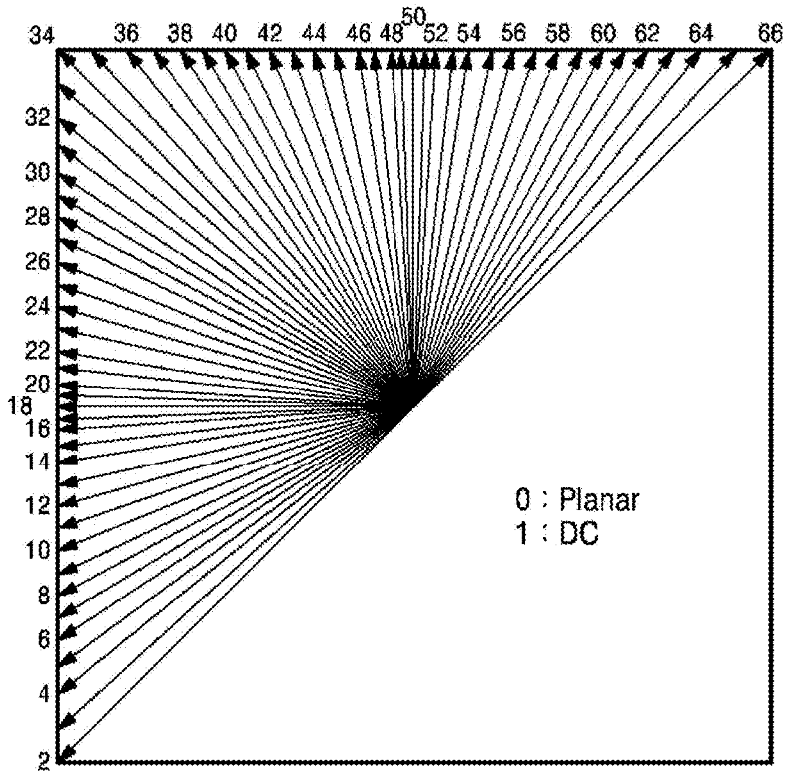
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
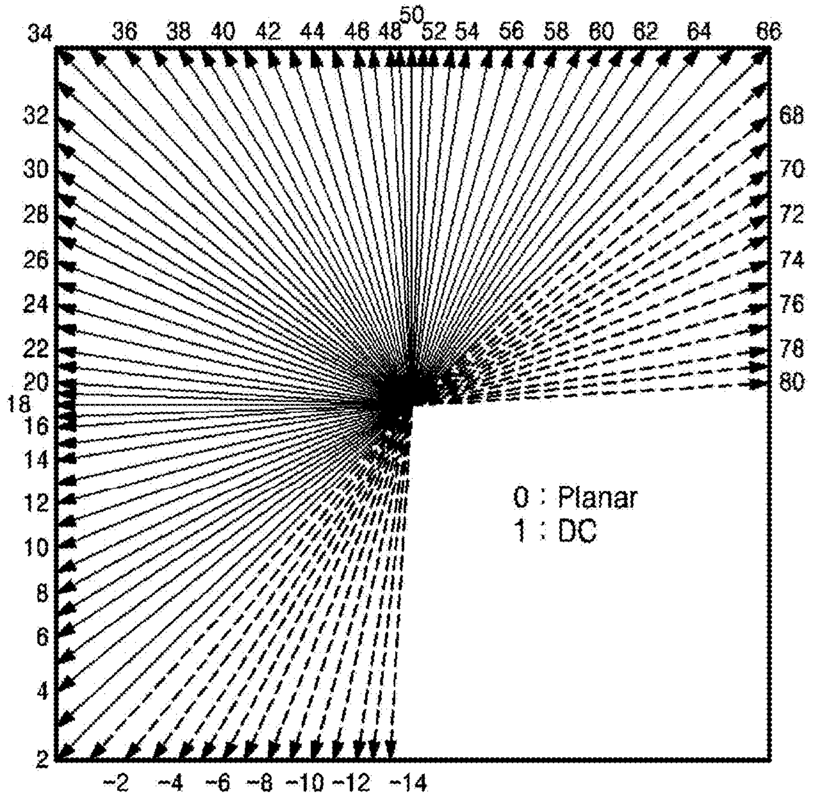

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
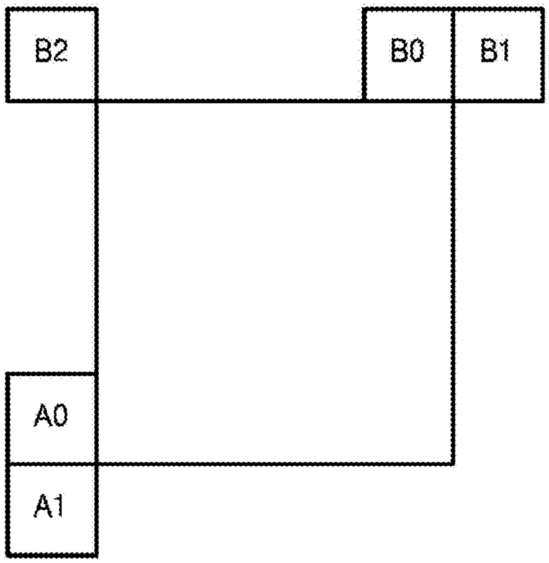
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
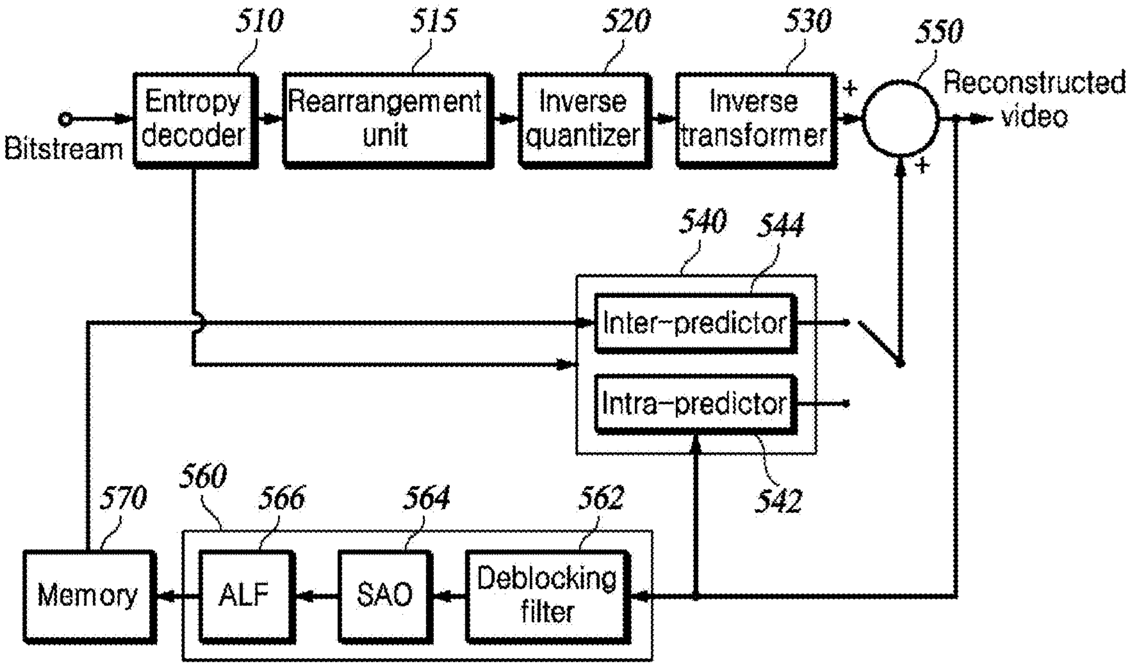
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

FIG. 6A, FIG. 6B, FIG. 6C, and FIG. 6D are diagrams for describing reference samples of a Position-Dependent Prediction Combination (PDPC), according to at least one embodiment of the present disclosure. The terms intra screen prediction mode and intra-prediction mode are synonymous and may be used interchangeably. In intra prediction, samples present in the bottom-right region of the current block, which is farther away from the reference sample may have lower prediction accuracy. Prediction may perform well for small blocks, while it may not perform well for large blocks. The position-dependent prediction combination may use filtered and unfiltered reference samples depending on the sample location, prediction mode, and size of the block.

The position-dependent prediction combination may correct the predicted value by using the difference value between the reference samples. The position-dependent prediction combination may be applied for the planar prediction mode, DC prediction mode, horizontal prediction mode, vertical prediction mode, bottom-left prediction mode, the eight prediction modes adjacent to the bottom-left prediction mode, the bottom-right prediction mode, and the eight prediction modes adjacent to the bottom-right prediction mode. The final prediction sample for the position-dependent prediction combination may be determined with a linear combination of a first reference sample and a second reference sample corresponding to the first reference sample based on the intra-prediction mode of the current block.

Figure 6A:
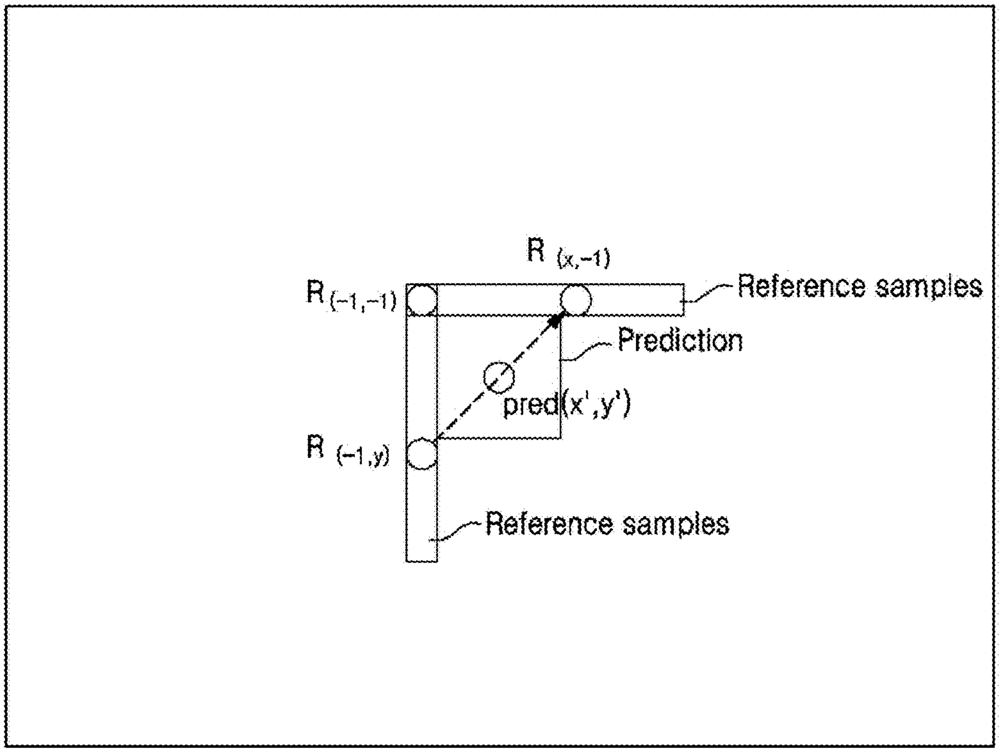
FIGS. 6A, 6B, 6C, and 6D are diagrams for describing reference samples of a position-dependent prediction combination, according to at least one embodiment of the present disclosure.

Referring to FIG. 6A, when the intra-prediction mode of the current block is a top-right diagonal mode, a first reference sample $R_{(x,-1)}$ and a second reference sample $R_{(-1,y)}$ corresponding to the first reference sample may be used. $R_{(x,-1)}$ and $R_{(-1,y)}$ may be linearly combined to generate the final prediction sample.

Figure 6B:
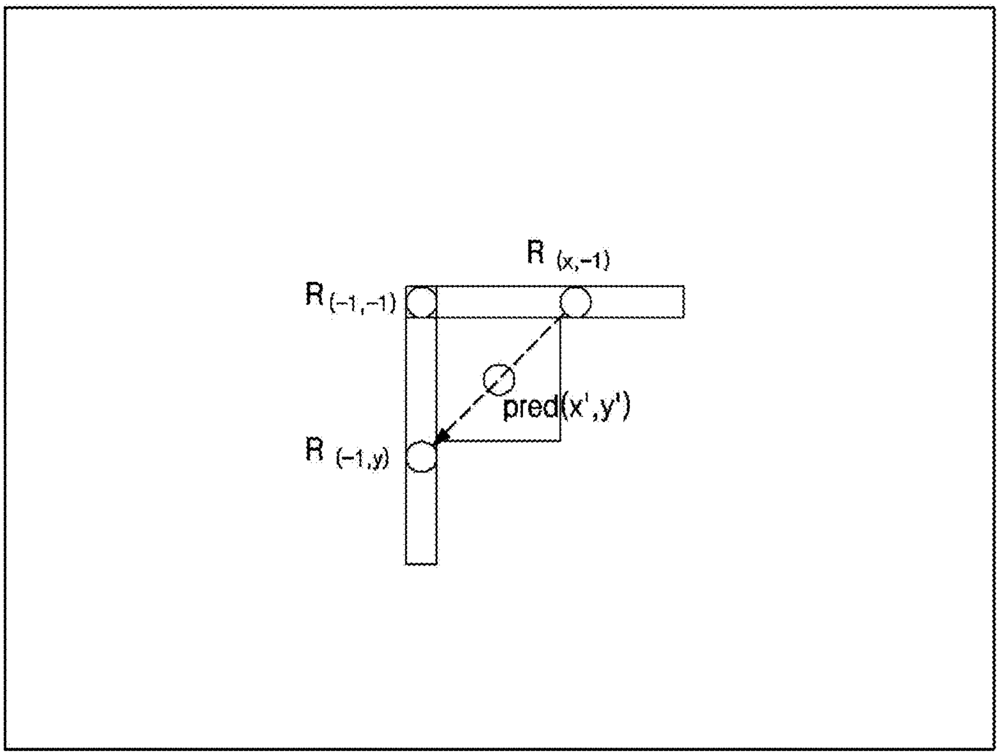

Referring to FIG. 6B, when the intra-prediction mode of the current block is the bottom-left diagonal mode, a first reference sample $R_{(-1,y)}$ and a second reference sample $R_{(x,-1)}$ corresponding to the first reference sample may be used. A linear combination of $R_{(x,-1)}$ and $R_{(-1,y)}$ may be used to generate the final prediction sample.

Figure 6C:
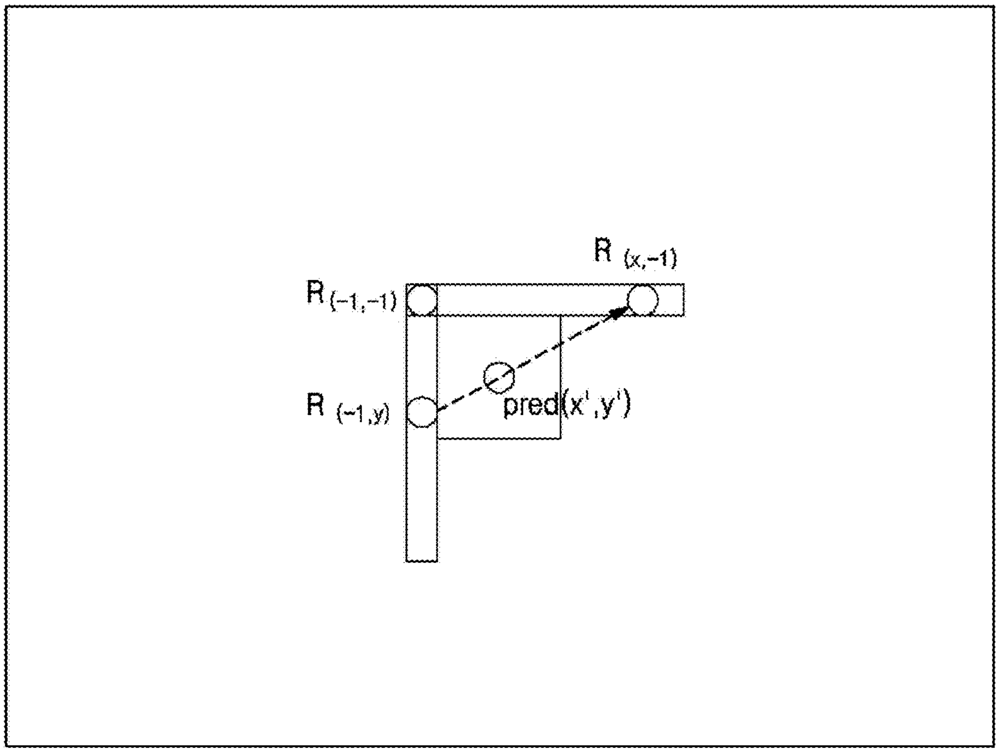

Referring to FIG. 6C, when the intra-prediction mode of the current block is a mode adjacent to the top-right diagonal mode, a first reference sample $R_{(x,-1)}$ and a second reference sample $R_{(-1,y)}$ corresponding to the first reference sample may be used. A linear combination of $R_{(x,-1)}$ and $R_{(-1,y)}$ may be used to generate the final prediction sample.

Figure 6D:
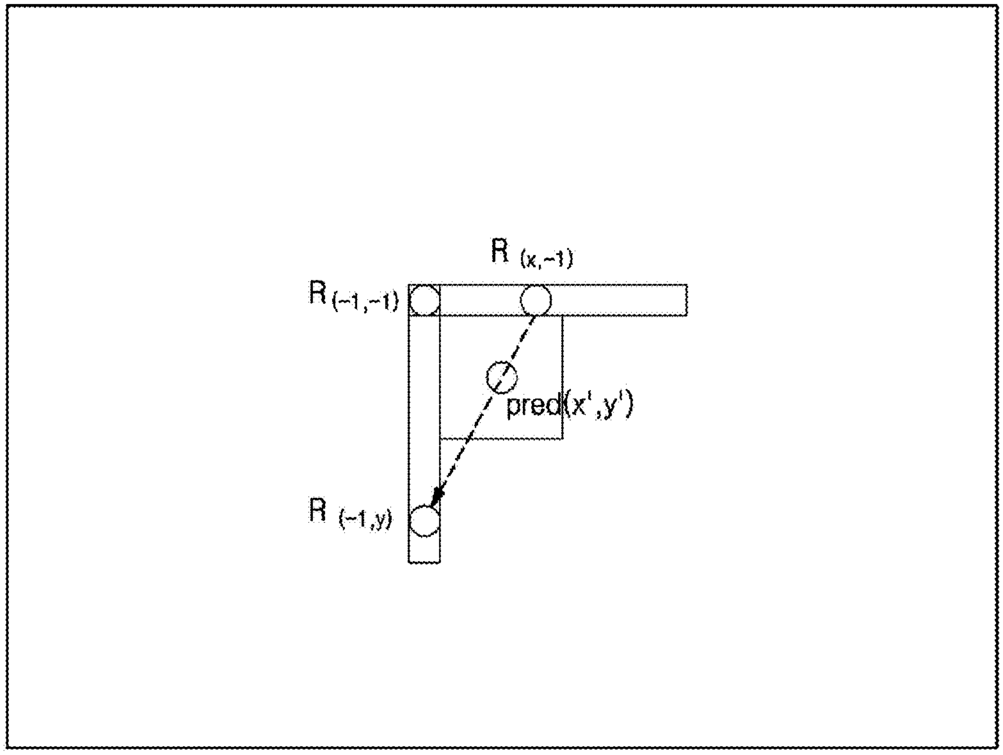

Referring to FIG. 6D, when the intra-prediction mode of the current block is a mode adjacent to the bottom-left diagonal mode, a first reference sample $R_{(-1,y)}$ and a second reference sample $R_{(x,-1)}$ corresponding to the first reference sample may be used. A linear combination of $R_{(x,-1)}$ and $R_{(-1,y)}$ may be used to generate the final prediction sample.

Figure 7:
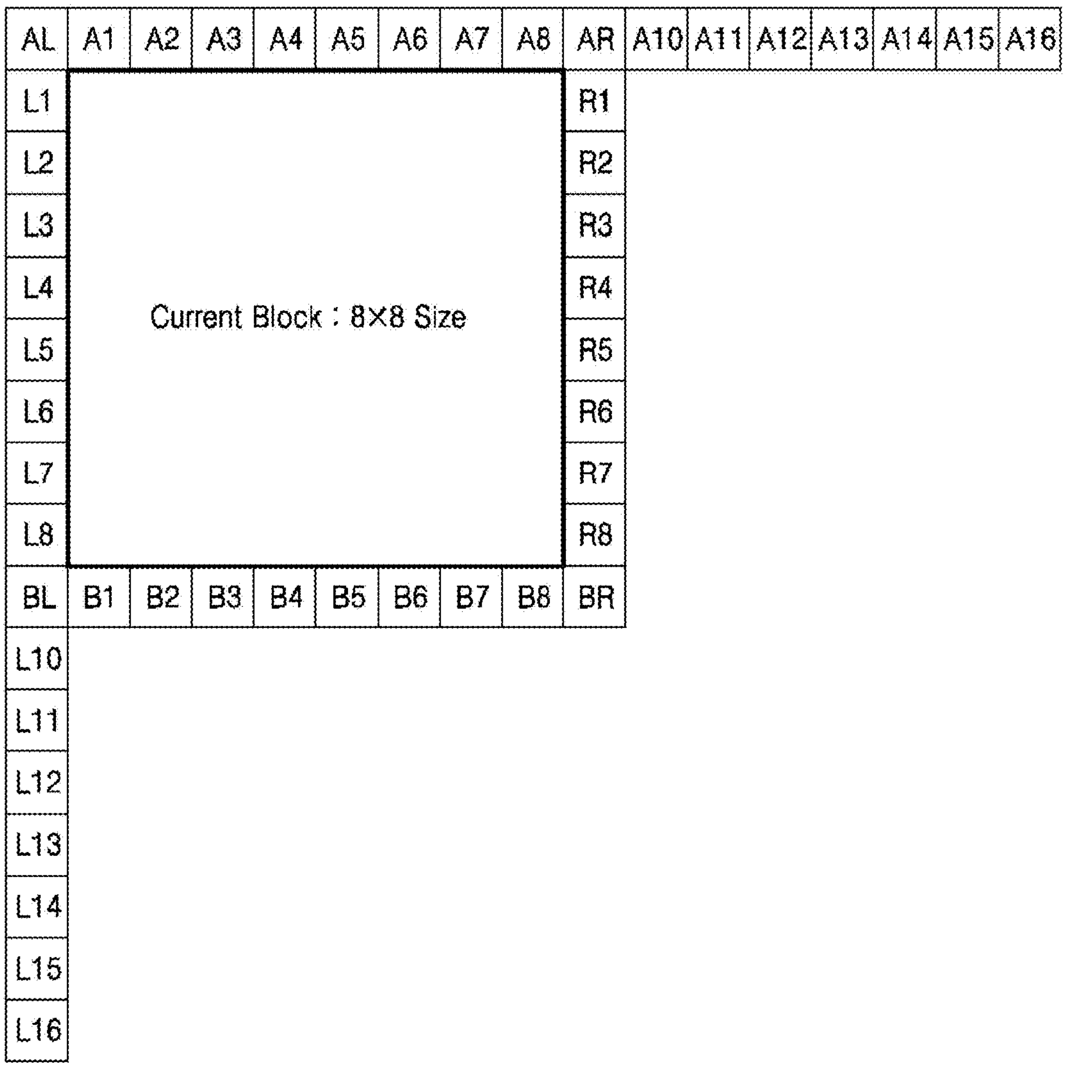
FIG. 7 is a diagram for describing a current block and reference samples neighboring the current block, according to at least one embodiment of the present disclosure.

FIG. 7 is a diagram for describing a current block and reference samples neighboring the current block, according to at least one embodiment of the present disclosure. The intra-prediction modes may be composed of a planar mode and a DC mode, which are 2 non-directional modes, 65 directional modes, and 20 wide-angle modes. In a square block, the 2 non-directional modes and 65 directional modes may be used. The 65 directional modes may be categorized into horizontally oriented and vertically oriented based on the prediction direction. The 65 directional modes may be categorized into positive and negative directions based on the reference sample used. The 65 directional modes may be divided into four main categories.

First, there may be vertical and positively oriented modes. The vertical and positive angular modes may correspond to modes 51 through 66. Second, there may be horizontal and positively oriented modes. The horizontal and positive angular modes may correspond to modes 2 through 17. The third modes may be vertical and negatively oriented modes. The vertical and negative angular modes may correspond to modes 34 through 49. The fourth modes may be horizontal and negatively oriented mode. The horizontal and negative angular mode may correspond to modes 19 through 33. Modes 18 and 50 are excluded from the four categories described above. Mode 18 is a horizontal mode and mode 50 is a vertical mode, which are special directional modes.

Referring to FIG. 7, the size of the current block may be 8×8. Reference samples may be present around the current block. At the top of the current block, there may be neighboring reference samples AL through A16. There may be neighboring reference samples L1 through L16 to the left of the current block. AL~A16 and L1~L16 may be reconstructed reference samples and correspond to the first reference samples. At the bottom of the current block, there may be neighboring reference samples B1 through BR. There may be neighboring reference samples R1 through R8 on the right side of the current block. B1 through BR and R1 through R8 may be samples that have not yet been encoded and decoded and correspond to the second reference samples. The second reference samples may be located in the opposite direction of the prediction direction of the first reference samples.

To construct second reference samples for the current block of size 8×8, a predicted block of size 9×9 may be generated by taking into account the directionality of the intra-prediction mode of the current block. Relative to the generated 9×9-sized predicted block, the rightmost sample and the bottommost sample may correspond to the second reference samples. If the top-left sample of the current block is at position (1,1), then the rightmost samples in the 9×9 predicted block may correspond to samples at position (9,1) through (9,9). If the top-left sample in the current block is at position (1,1), the bottommost samples in the 9×9 predicted block may correspond to samples at position (1,9) through position (8,9).

If the current block is of size N×N, a predicted block of size (N+1)×(N+1) may be generated based on the directionality of the intra-prediction mode of the current block. Relative to the generated predicted block of size (N+1)×(N+1), the rightmost samples and the bottommost samples may correspond to the second reference samples. If the top-left sample of the current block is at position (1,1), the rightmost samples relative to the predicted block of size (N+1)×(N+1) may correspond to the samples at positions (N+1,1) through (N+1, N+1). If the top-left sample in the current block is at position (1,1), the bottommost samples relative to the predicted block of size (N+1)×(N+1) may correspond to the samples at positions (1, N+1) through (N, N+1). Two samples may be selected based on the directionality of the intra-prediction mode of the current block. The present disclosure may use the difference between the two samples to correct the second reference samples.

Figure 8:
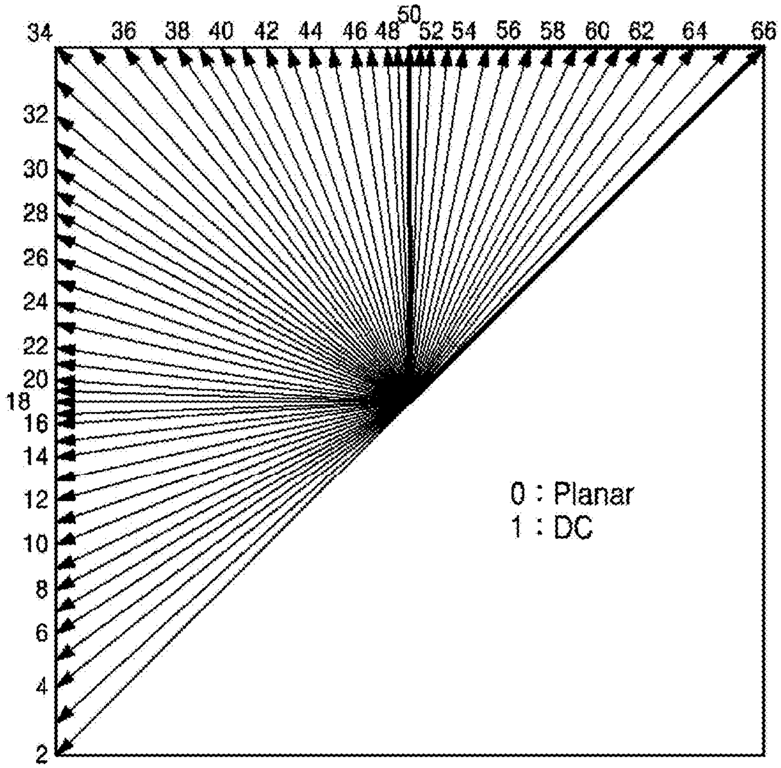
FIG. 8 is a diagram for describing a range of vertical and positive angular modes, according to at least one embodiment of the present disclosure.

FIG. 8 is a diagram for describing a range of vertical and positive angular modes, according to at least one embodiment of the present disclosure.

Referring to FIG. 8, the vertical and positive angular modes may correspond to modes 51 through 66. Modes 51 through 66 may be distinguished by their vertical orientation based on their prediction direction. Modes 51 through 66 may be distinguished to be in the positive direction based on the reference sample.

Figure 9:
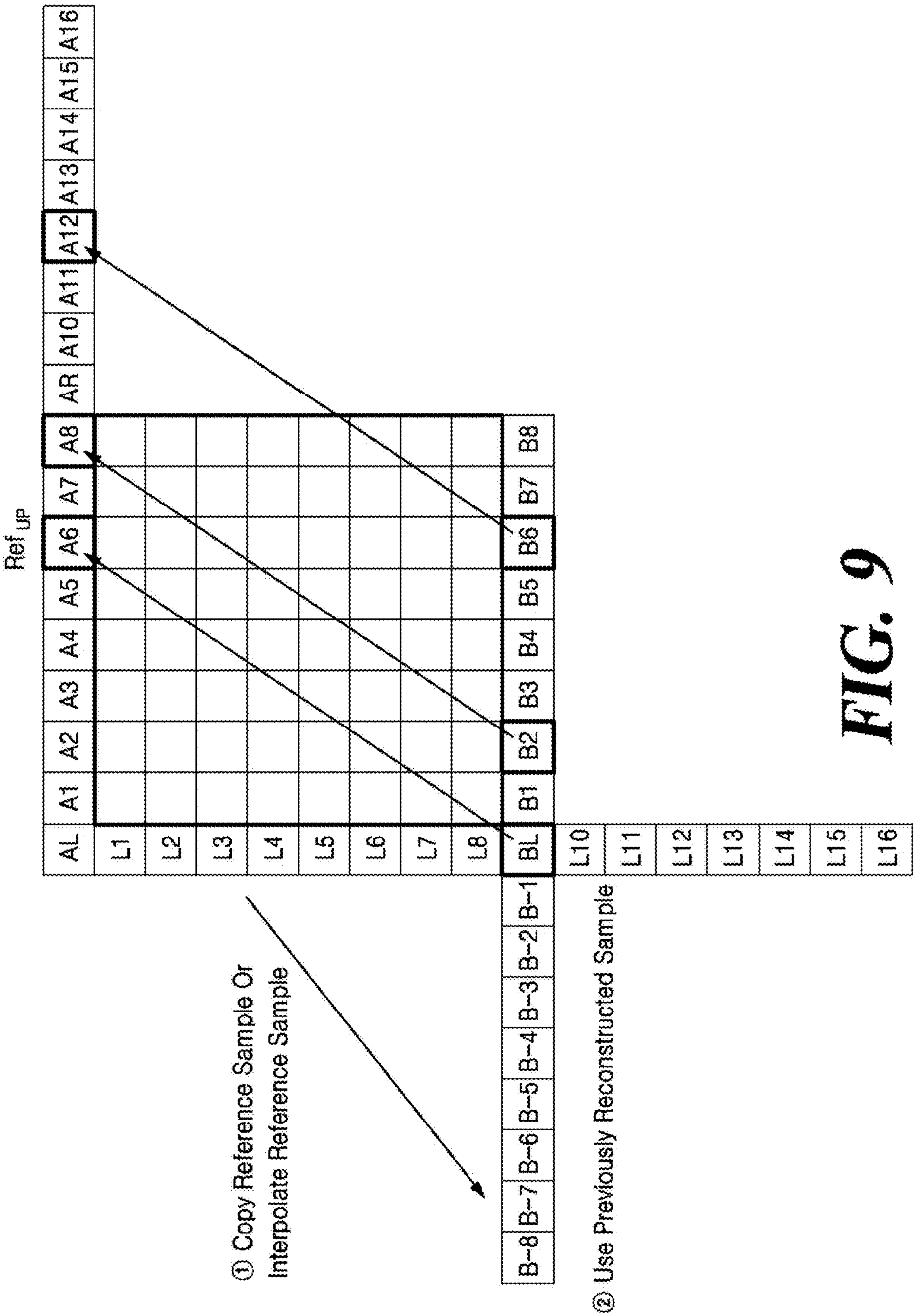
FIG. 9 is a diagram for describing a method of generating and correcting second reference samples for vertical and positive angular modes, according to at least one embodiment of the present disclosure.

FIG. 9 is a diagram for describing a method of generating and correcting second reference samples for vertical and positive angular modes, according to at least one embodiment of the present disclosure.

Referring to FIG. 9, reference samples AL through A16 adjacent to the top of the current block and reference samples L1 through L16 adjacent to the left side of the current block may be the reconstructed reference samples. B-8 through B-1 and B1 through B8 may be the second reference samples. B1 through B8 may be generated by performing an intra prediction on the intra-prediction mode of the current block. For example, the second reference sample B6 may be generated by using an interpolated value around the first reference sample A12, corresponding to the intra-prediction mode of the current block. For example, the second reference sample B2 may be generated by using an interpolated value around the first reference sample A8, corresponding to the intra-prediction mode of the current block.

The second reference samples B-8 through B-1 may be generated by copying the values of the neighboring reference samples L1 through L8 adjacent to the left of the current block. For example, the second reference sample B-8 may be generated by copying the value of the corresponding first reference sample L1. For example, the second reference sample B-7 may be generated by copying the value of the corresponding first reference sample L2. For example, the second reference sample B-1 may be generated by copying the value of the corresponding first reference sample L8. The second reference samples B-8 through B-1 may be generated by using the interpolated values of the first reference samples corresponding to the respective second reference samples, taking into account the directionality of the intra-prediction mode of the current block. Since the second reference samples B-8 through B-1 reside in a reconstructed region, they may be generated by using the reconstructed sample values corresponding to their locations.

The generated second reference samples may be corrected. There may be two ways to correct the second reference sample. In the first method, a difference may be calculated between the value of the bottom-left sample BL of the current block and the value of its corresponding first reference sample $Ref_{UP}$. The second reference samples may be corrected by reflecting this difference in the second reference samples. This method may be expressed as $Bi'=Bi+(BL-Ref_{UP})$. Here, Bi' may be corrected second reference samples, and Bi may be uncorrected second reference samples. 'i' may be represented by 1≤i≤block size.

In the second method, the difference may be calculated between the value of the bottom-left sample BL of the current block and the value of its corresponding first reference sample $Ref_{UP}$. Based on this difference, and reflecting the distances between BL and the second reference samples to be corrected, the second reference samples may be corrected. This method may be expressed as $Bi'=Bi+(BL-Ref_{UP})>>(i-1)$. The weighting value for the distances between BL and the second reference samples to be corrected may be arbitrarily determined. Here, Bi' may be corrected second reference samples, and Bi may be uncorrected second reference samples. 'i' may be represented by 1≤i≤block size.

Figure 10:
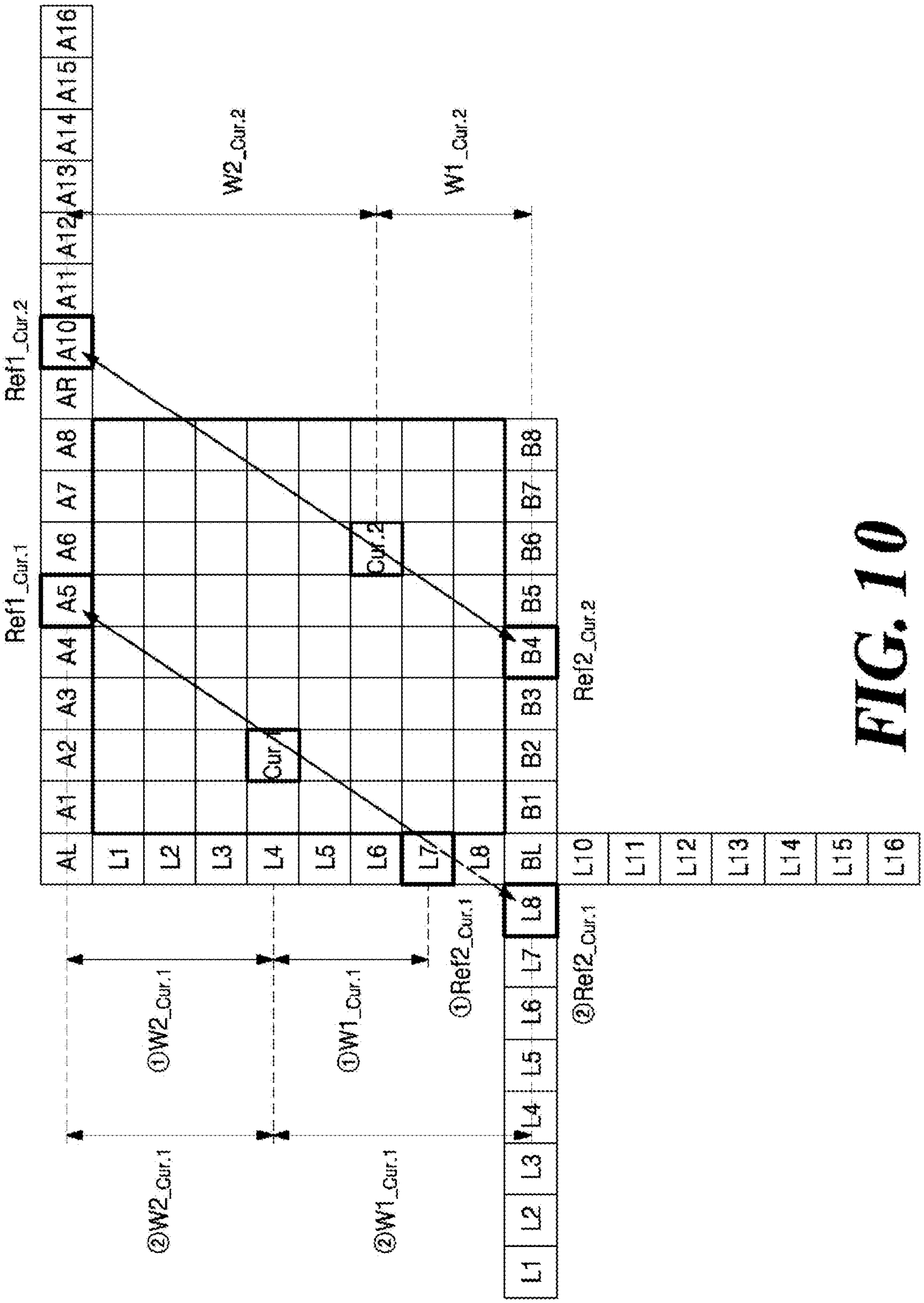
FIG. 10 is a diagram for describing a method of performing a bi-directional intra prediction for the vertical and positive angular modes, according to at least one embodiment of the present disclosure.

FIG. 10 is a diagram for describing a method of performing a bi-directional intra prediction for the vertical and positive angular modes, according to at least one embodiment of the present disclosure.

Referring to FIG. 10, $W1_{\_Cur1}$, $W2_{\_Cur1}$, $W1_{\_Cur2}$, and $W2_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.2 may be generated by linearly interpolating the value of the first reference sample $Ref1_{\_Cur.2}$ with the value of the second reference sample $Ref2_{\_Cur.2}$. This linear interpolation expression may be represented as $Pred\_Cur.2=W1_{\_Cur.2}\times$ $Ref1_{\_Cur.2}+W2_{\_Cur.2}\times Ref2_{\_Cur.2}$. Additionally, the predicted value of sample Cur.2 may be generated by averaging the value of the first reference sample $Ref1_{\_Cur.2}$ and the value of the second reference sample $Ref2_{\_Cur.2}$. Here, the value of the second reference sample $Ref2_{\_Cur.2}$ may be a corrected value.

The predicted value of sample Cur.1 may be generated in different ways depending on which sample is used as the second reference sample. For example, the predicted value of sample Cur.1 may be generated by linearly interpolating the value of the first reference sample $Ref1_{_Cur.1}$ with the value of the second reference sample ①$Ref2_{_Cur.1}$. This linear interpolation expression may be represented as Pred_Cur.1=①$W1_{_Cur.1}\times Ref1_{_Cur.1}$+①$W2_{_Cur.1}\times$① $Ref2_{_Cur.1}$. Additionally, the predicted value of sample Cur.1 may be generated by averaging the value of the first reference sample $Ref1_{_Cur.1}$ and the value of the second reference sample ①$Ref2_{_Cur.1}$. Here, the value of the second reference sample ①$Ref2_{_Cur.1}$ may be the corrected value.

The predicted value of sample Cur.1 may be generated by linearly interpolating the value of the first reference sample Ref1_Cur.1 with the value of the second reference sample ②$Ref2_{_Cur.1}$. This linear interpolation expression may be represented as Pred_Cur.1=②$W1_{_Cur.1}\times Ref1_{_Cur.1}$+②$W2_{_Cur.1}\times$② $Ref2_{_Cur.1}$. Additionally, the predicted value of sample Cur.1 may be generated by averaging the value of the first reference sample $Ref1_{_Cur.1}$ and the value of the second reference sample ②$Ref2_{_Cur.1}$. Here, the value of the second reference sample ②$Ref2_{_Cur.1}$ may be the corrected value. In this way, by generating predicted values of all samples in the current block, the predicted block of the current block may be generated.

Figure 11:
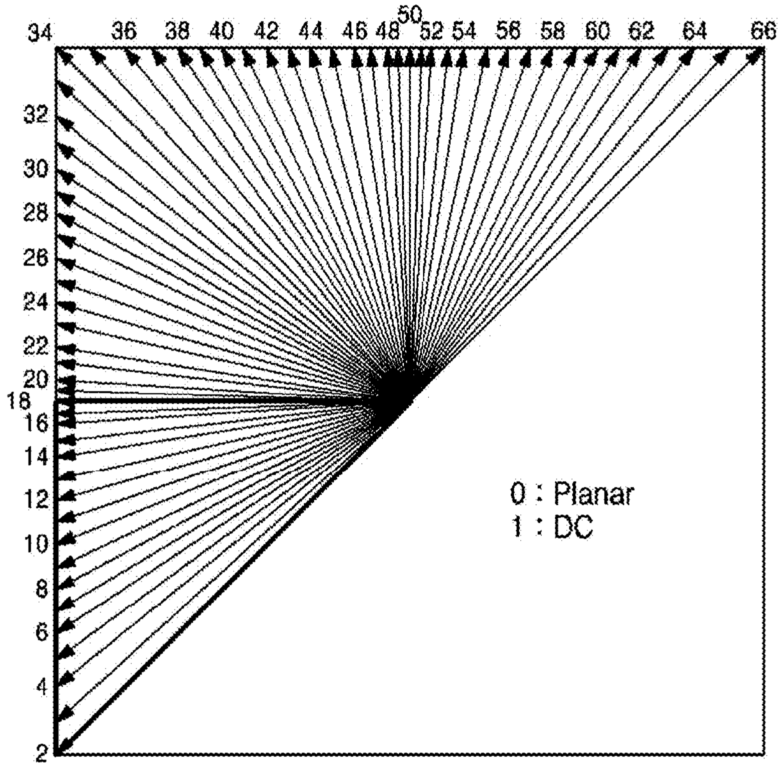
FIG. 11 is a diagram for describing a range of horizontal and positive angular modes, according to at least one embodiment of the present disclosure.

FIG. 11 is a diagram for describing a range of horizontal and positive angular modes, according to at least one embodiment of the present disclosure.

Referring to FIG. 11, horizontal and positive angular modes may be modes 2 through 17. Modes 2 through 17 may be distinguished by their horizontal orientation based on their prediction direction. Modes 2 through 17 may be distinguished to be in a positive direction based on the reference sample.

Figure 12:
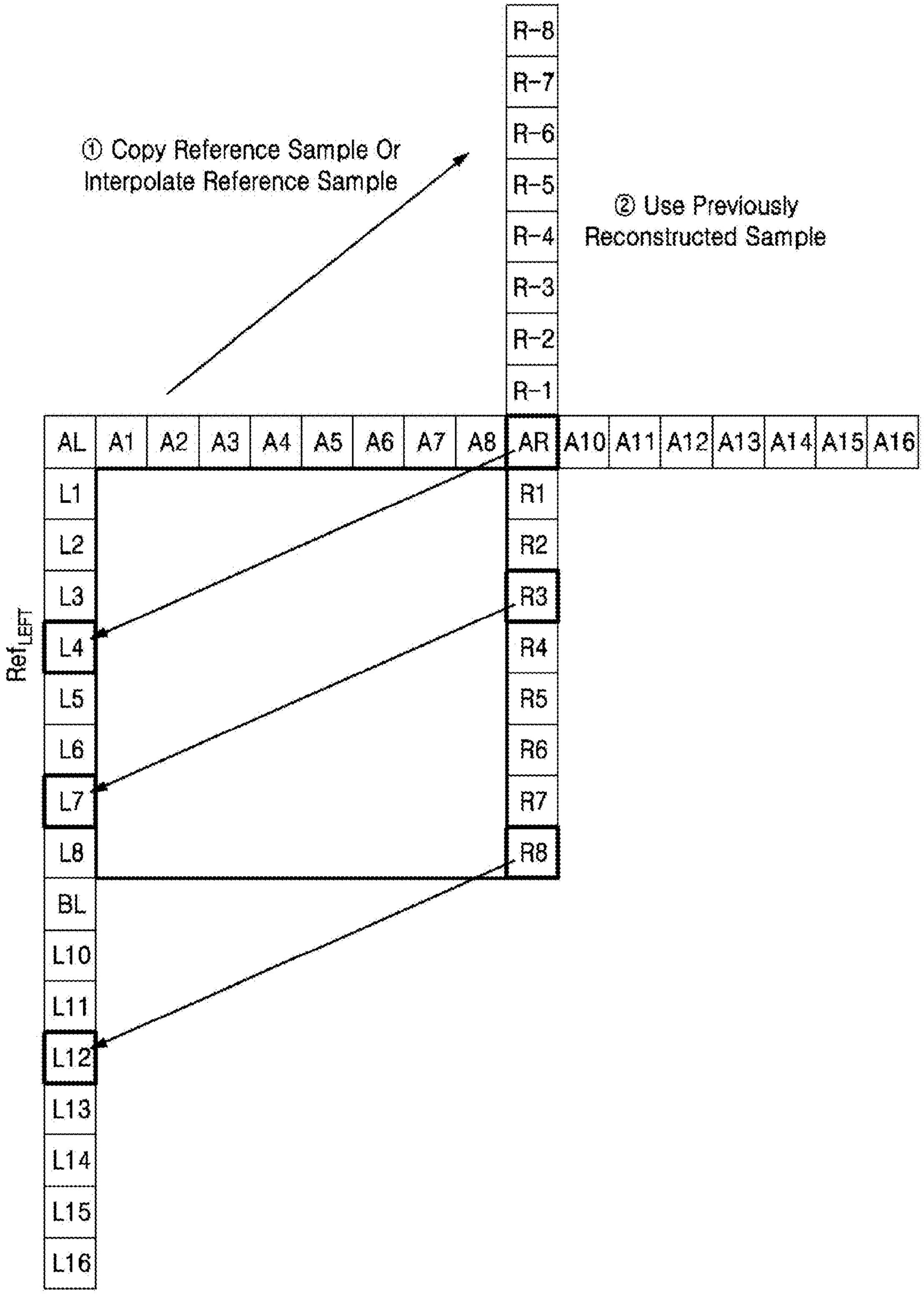
FIG. 12 is a diagram for describing a method of generating and correcting second reference samples for the horizontal and positive angular modes, according to at least one embodiment of the present disclosure.

FIG. 12 is a diagram for describing a method of generating and correcting second reference samples for the horizontal and positive angular modes, according to at least one embodiment of the present disclosure.

Referring to FIG. 12, reference samples AL through A16 adjacent to the top of the current block and reference samples L1 through L16 adjacent to the left side of the current block may be reconstructed reference samples. R-8 through R-1 and R1 through R8 may be second reference samples. R1 through R8 may be generated by performing an intra prediction on the intra-prediction mode of the current block. For example, the second reference sample R8 may be generated by using an interpolated value around the first reference sample L12 corresponding to the intra-prediction mode of the current block. For example, the second reference sample R3 may be generated by using an interpolated value around the first reference sample L7 corresponding to the intra-prediction mode of the current block.

The second reference samples R-8 through R-1 may be generated by copying the values of the reference samples A1 through A8 adjacent to the top of the current block. For example, the second reference sample R-8 may be generated by copying the value of its corresponding first reference sample A1. For example, the second reference sample R-7 may be generated by copying the value of its corresponding first reference sample A2. For example, the second reference sample R-1 may be generated by copying the value of its corresponding first reference sample A8. The second reference samples R-8 through R-1 may be generated by using interpolated values of the corresponding first reference samples to the respective second reference samples, taking into account the directionality of the intra-prediction mode of the current block. Since the second reference samples R-8 through R-1 are present in the reconstructed region, they may be generated by using the reconstructed sample values corresponding to their locations.

The generated second reference samples may be corrected. There may be two ways to correct the second reference samples. In the first method, a difference may be calculated between the value of the top-right sample AR of the current block and the value of its corresponding first reference sample $Ref_{LEFT}$. By reflecting this difference in the second reference samples, the second reference samples may be corrected. This method may be expressed as Ri'=Ri+(AR-$Ref_{LEFT}$). Here, Ri' may be corrected second reference samples, and Ri may be uncorrected second reference samples. 'i' may be represented by 1≤i≤block size.

In the second method, the difference may be calculated between the value of the top-right sample AR of the current block and the value of its corresponding first reference sample $Ref_{LEFT}$. Based on this difference, and reflecting the distances between AR and the second reference samples to be corrected, the second reference samples may be corrected. This method may be expressed as Ri'=Ri+(AR-$Ref_{LEFT}$)>>(i-1). The weighting value for the distances between AR and the second reference samples to be corrected may be arbitrarily determined. Ri' may be corrected second reference samples, and Ri may be uncorrected second reference samples. 'i' may be represented by 1≤i≤block size. prediction for the horizontal and positive angular modes, according to at least one embodiment of the present disclosure.

Figure 13:
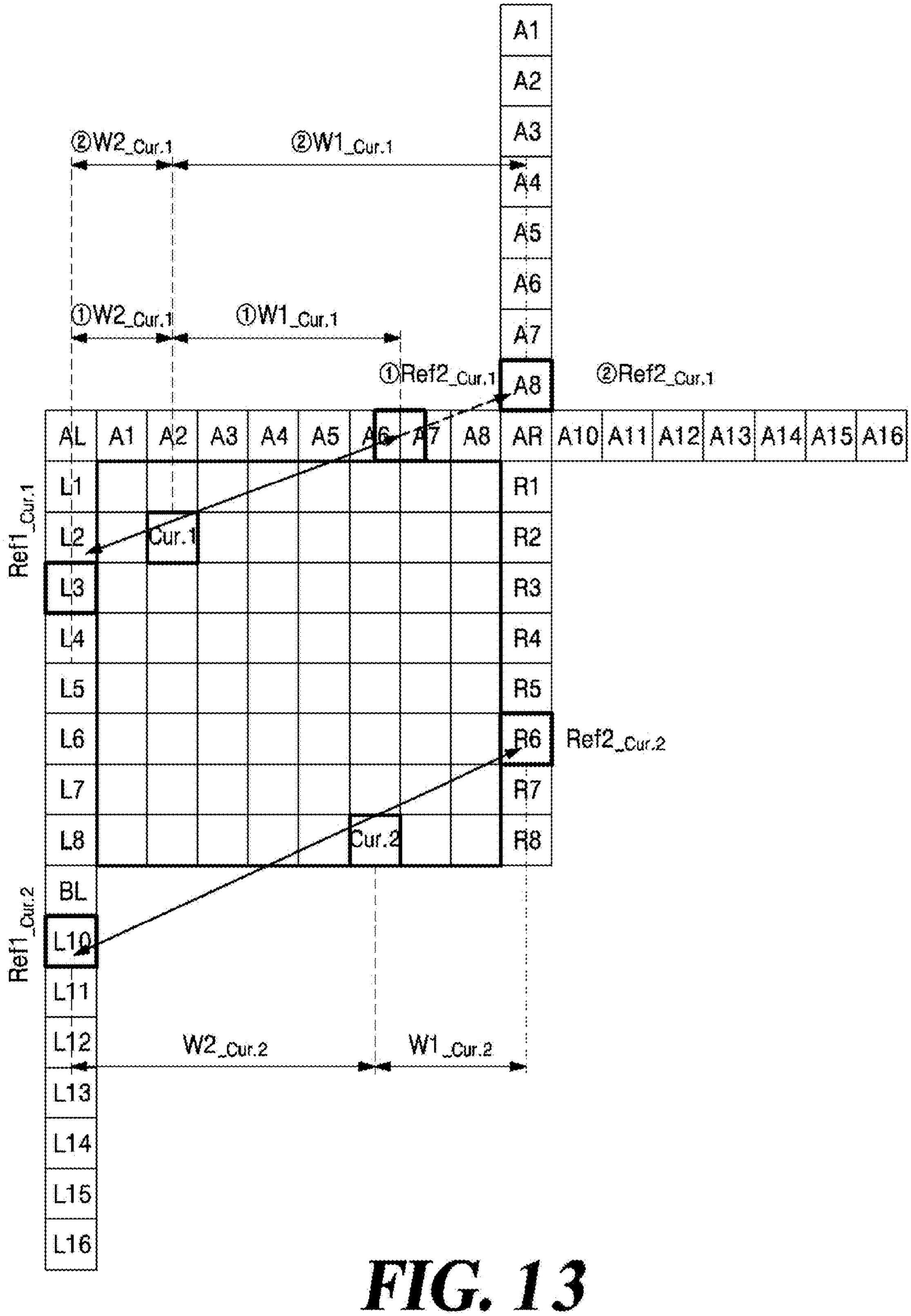
FIG. 13 is a diagram for describing a method of performing a bi-directional intra prediction for the horizontal and positive angular modes, according to at least one embodiment of the present disclosure.

Referring to FIG. 13, $W1_{\_Cur1}$, $W2_{\_Cur1}$, $W1_{\_Cur2}$, and $W2_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.2 may be generated by linearly interpolating the value of the first reference sample Ref1_Cur.2 and the value of the second reference sample $Ref2_{\_Cur.2}$. This linear interpolation expression may be represented as Pred_Cur.2=$W1_{\_Cur.2}\times Ref1_{\_Cur.2}+W2_{\_Cur.2}\times Ref2_{\_Cur.2}$. Additionally, the predicted value of sample Cur.2 may be generated by averaging the value of the first reference sample $Ref1_{\_Cur.2}$ and the value of the second reference sample $Ref2_{\_Cur.2}$. Here, the second reference sample $Ref2_{\_Cur.2}$ may be a corrected value.

The predicted value of sample Cur.1 may be generated in different ways depending on which sample is used as the second reference sample. For example, the predicted value of sample Cur.1 may be generated by linearly interpolating the value of the first reference sample Ref1_Cur.1 with the value of the second reference sample ①$Ref2_{_Cur.1}$. This linear interpolation expression may be represented as Pred_Cur.1=①$W1_{_Cur.1}\times Ref1_{_Cur.1}$+①$W2_{_Cur.1}\times$① $Ref2_{_Cur.1}$. Additionally, the predicted value of sample Cur.1 may be generated by averaging the value of the first reference sample $Ref1_{_Cur.1}$ and the value of the second reference sample ①$Ref2_{_Cur.1}$. Here, the second reference sample ①$Ref2_{_Cur.1}$ may be a corrected value.

The predicted value of sample Cur.1 may be generated by linearly interpolating the value of the first reference sample Ref1$_{\_Cur.1}$ with the value of the second reference sample ②Ref2$_{\_Cur.1}$. This linear interpolation expression may be represented as Pred_Cur.1=②W1$_{\_Cur.1}$×Ref1$_{\_Cur.1}$+②W2$_{\_Cur.1}$×② Ref2$_{\_Cur.1}$. Additionally, the predicted value of sample Cur.1 may be generated by averaging the value of the first reference sample Ref1$_{\_Cur.1}$ and the value of the second reference sample ②Ref2$_{\_Cur.1}$. Here, the second reference sample ②Ref2$_{\_Cur.1}$ may be a corrected value. In this way, by generating predicted values for all samples in the current block, a predicted block of the current block may be generated.

Figure 14:
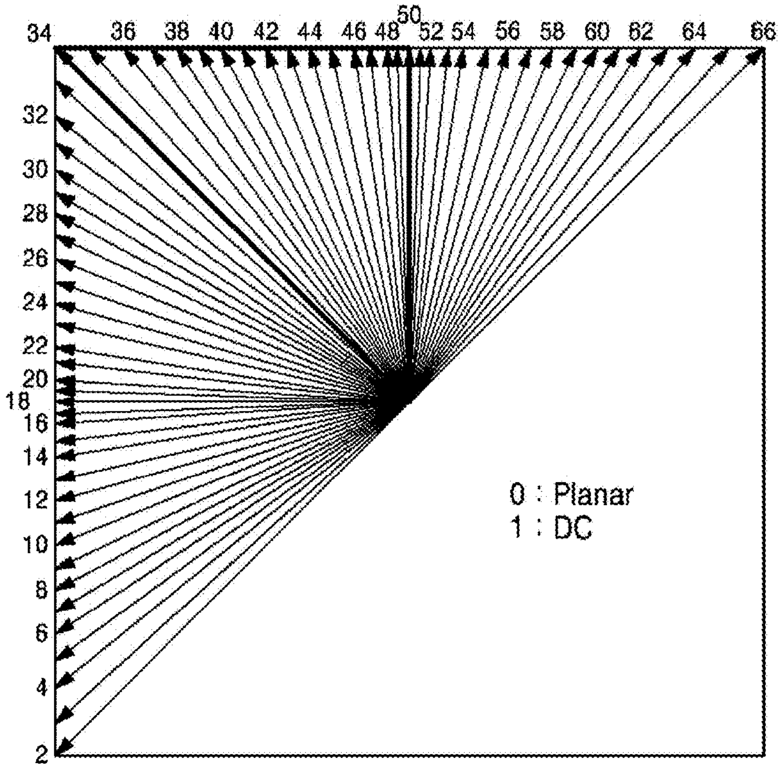
FIG. 14 is a diagram for describing a range of vertical and negative angular modes, according to at least one embodiment of the present disclosure.

FIG. 14 is a diagram for describing a range of vertical and negative angular modes, according to at least one embodiment of the present disclosure.

Referring to FIG. 14, the vertical and negative angular modes may be modes 34 through 49. Modes 34 through 49 may be distinguished by their vertical orientation based on their prediction direction. Modes 34 through 49 may be distinguished to be in the negative direction based on the reference sample.

Figure 15:
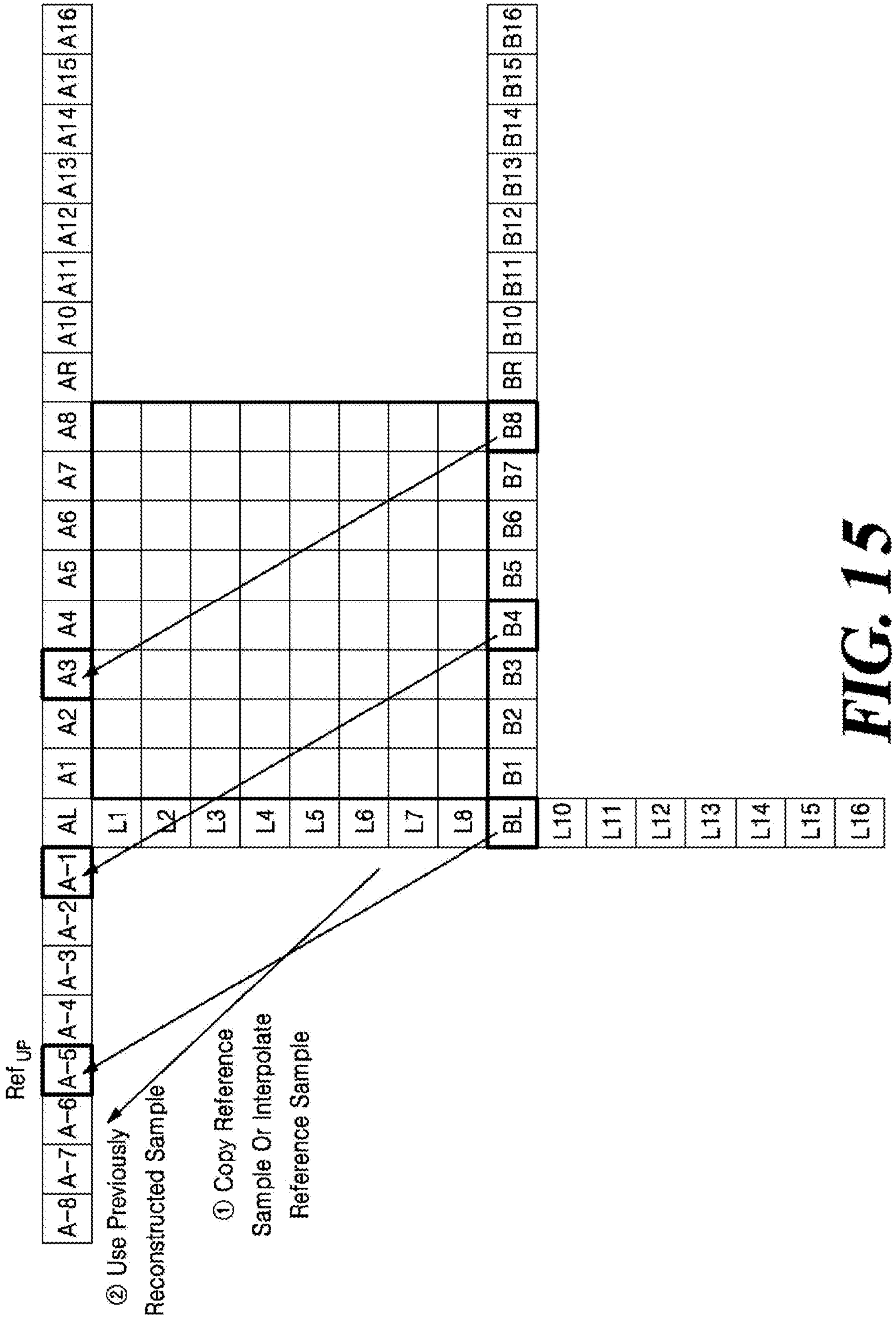
FIG. 15 is a diagram for describing a method of generating and correcting second reference samples for the vertical and negative angular modes, according to at least one embodiment of the present disclosure.

FIG. 15 is a diagram for describing a method of generating and correcting second reference samples for the vertical and negative angular modes, according to at least one embodiment of the present disclosure.

Referring to FIG. 15, reference samples AL through A16 adjacent to the top of the current block and reference samples L1 through L16 adjacent to the left side of the current block may be reconstructed reference samples. B1 through B16 may be the second reference samples. B1 through B16 may be generated by performing an intra prediction on the directionality of the intra-prediction mode of the current block. For example, the second reference sample B8 may be generated by using an interpolated value around the first reference sample A3 corresponding to the intra-prediction mode of the current block. For example, the second reference sample B4 may be generated by using an interpolated value around the first reference sample A-1 corresponding to the intra-prediction mode of the current block.

The first reference samples A-8 through A-1 may be generated by copying the values of the neighboring reference samples L1 through L8 adjacent to the left of the current block. For example, the first reference sample A-8 may be generated by copying the value of its corresponding first reference sample L8. For example, the first reference sample A-7 may be generated by copying the value of its corresponding first reference sample L7. For example, the first reference sample A-1 may be generated by copying the value of its corresponding first reference sample L1. The first reference samples A-8 through A-1 may be generated by using interpolated values of the first reference samples adjacent to the left side of the current block, corresponding to the respective first reference samples, taking into account the directionality of the intra-prediction mode of the current block. Since the first reference samples A-8 through A-1 reside in a reconstructed region, they may be generated by using the reconstructed sample values corresponding to their locations.

The generated second reference samples may be corrected. There may be two ways to correct the second reference samples. In the first method, a difference may be calculated between the value of the bottom-left sample BL of the current block and the value of its corresponding first reference sample Ref$_{UP}$. By reflecting this difference value in the second reference samples, the second reference samples may be corrected. This method may be expressed as Bi'=Bi+(BL−Ref$_{UP}$). Here, Bi' may be corrected second reference samples, and Bi may be uncorrected second reference samples. 'i' may be represented by 1≤i≤block size.

In the second method, the difference may be calculated between the value of the bottom-left sample BL of the current block and the value of its corresponding first reference sample Ref$_{UP}$. Based on this difference, and reflecting the distances between BL and the second reference samples to be corrected, the second reference samples may be corrected. This method may be expressed as Bi'=Bi+(BL−Ref$_{UP}$)>>(i-1). The weighting value for the distances between BL and the second reference samples to be corrected may be arbitrarily determined. Here, Bi' may be corrected second reference samples, and Bi may be uncorrected second reference samples. 'i' may be represented by 1≤i≤block size.

Figure 16:
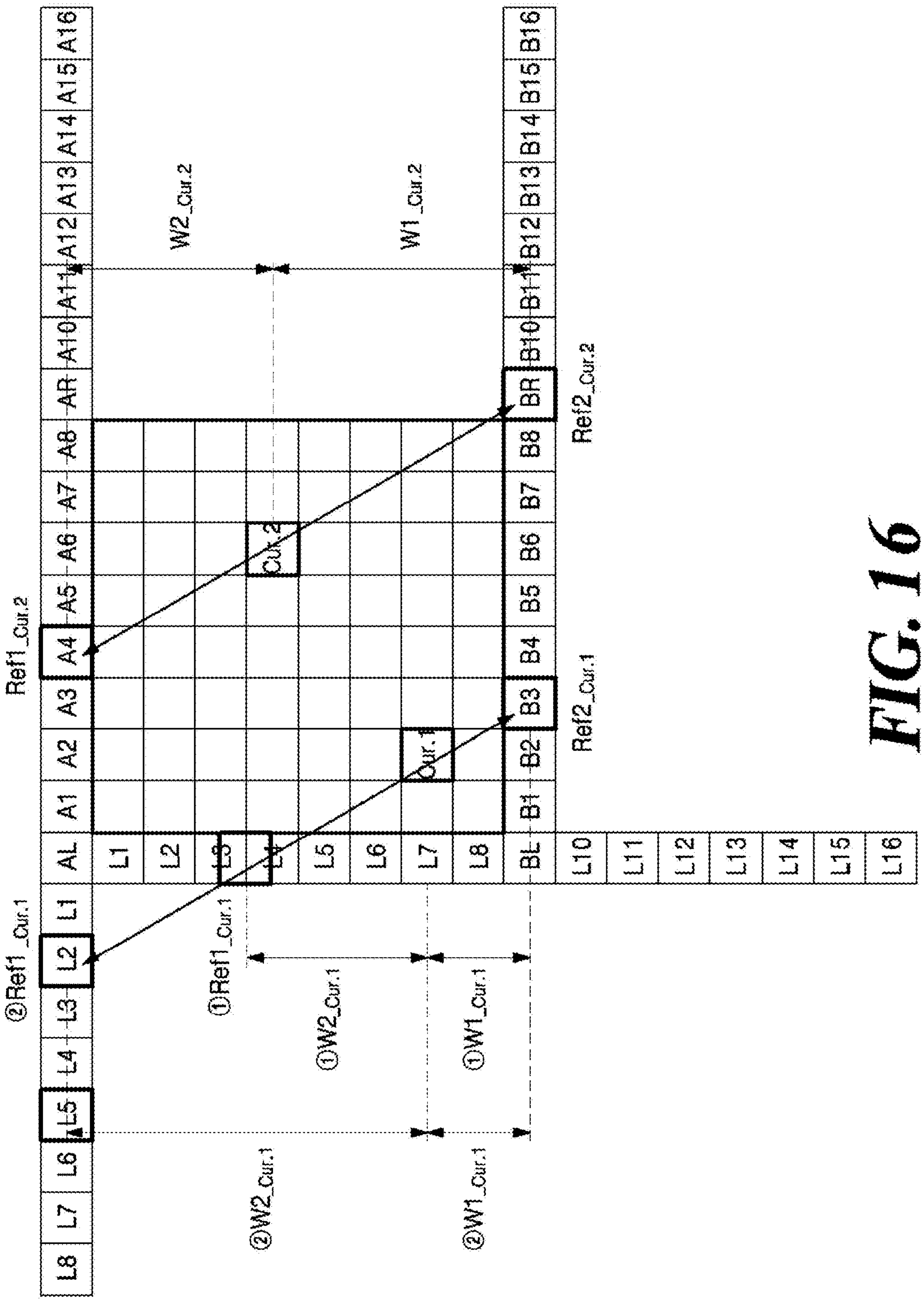
FIG. 16 is a diagram for describing a method of performing bi-directional intra prediction on vertical and negative angular modes, according to at least one embodiment of the present disclosure.

FIG. 16 is a diagram for describing a method of performing bi-directional intra prediction on vertical and negative angular modes, according to at least one embodiment of the present disclosure.

Referring to FIG. 16, W1$_{\_Cur1}$, W2$_{\_Cur1}$, W1$_{\_Cur2}$, and W2$_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.2 may be generated by linearly interpolating the value of the first reference sample Ref1$_{\_Cur.2}$ with the value of the second reference sample Ref2$_{\_Cur.2}$. This linear interpolation expression may be represented as Pred_Cur.2=W1$_{\_Cur.2}$×Ref1$_{\_Cur.2}$+W2$_{\_Cur.2}$×Ref2$_{\_Cur.2}$. Additionally, the predicted value of sample Cur.2 may be generated by averaging the value of the first reference sample Ref1_Cur.2 and the value of the second reference sample Ref2$_{\_Cur.2}$. Here, the second reference sample Ref2$_{\_Cur.2}$ may be a corrected value.

The predicted value of sample Cur.1 may be generated in different ways depending on which sample is used as the first reference sample. For example, the predicted value of sample Cur.1 may be generated by linearly interpolating the value of the first reference sample ①Ref1_Cur.1 with the value of the second reference sample Ref2$_{\_Cur.1}$. This linear interpolation expression may be represented as Pred_Cur.1=①W1$_{\_Cur.1}$×①Ref1$_{\_Cur.1}$+①W2$_{\_Cur.1}$× Ref2$_{\_Cur.1}$. Additionally, the predicted value of sample Cur.1 may be generated by averaging the value of the first reference sample ①Ref1$_{\_Cur.1}$ and the value of the second reference sample Ref2$_{\_Cur.1}$. Here, the second reference sample Ref2$_{\_Cur.1}$ may be a corrected value.

The predicted value of sample Cur.1 may be generated by linearly interpolating the value of the first reference sample ②Ref1$_{\_Cur.1}$ with the value of the second reference sample Ref2$_{\_Cur.1}$. This linear interpolation expression may be represented as Pred_Cur.1=②W1$_{\_Cur.1}$×②Ref1$_{\_Cur.1}$+②W2$_{\_Cur.1}$× Ref2$_{\_Cur.1}$. Additionally, the predicted value of sample Cur.1 may be generated by averaging the value of the first reference sample ②Ref1$_{\_Cur.1}$ and the value of the second reference sample Ref2$_{\_Cur.1}$. Here, the second reference sample Ref2$_{\_Cur.1}$ may be a corrected value. In this way, by generating predicted values for all samples in the current block, a predicted block of the current block may be generated.

Figure 17:
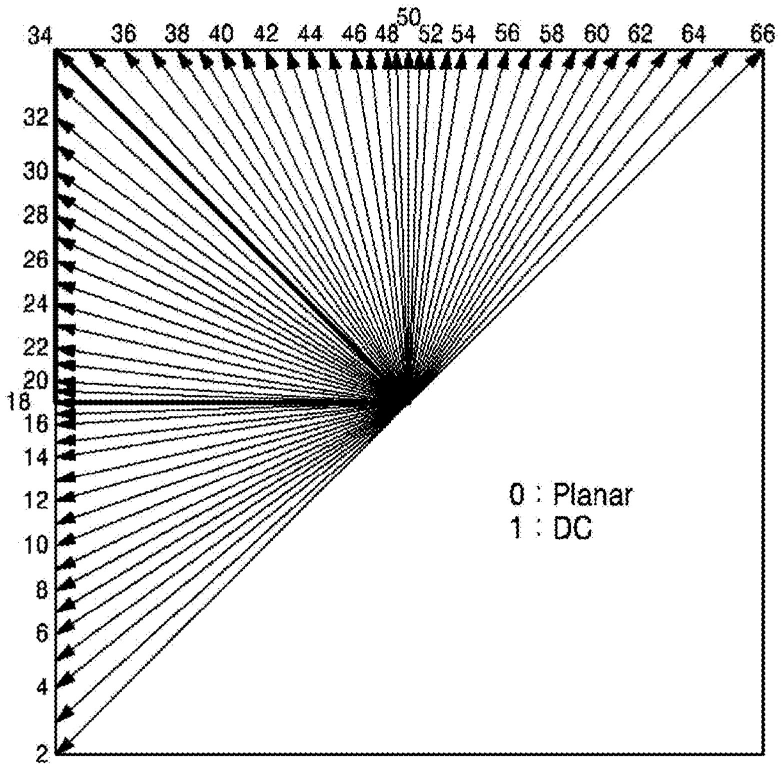
FIG. 17 is a diagram for describing a range of horizontal and negative angular modes, according to at least one embodiment of the present disclosure.

FIG. 17 is a diagram for describing a range of horizontal and negative angular modes, according to at least one embodiment of the present disclosure.

Referring to FIG. 17, the horizontal and negative angular mode may be modes 19 through 33. Modes 19 through 33 may be distinguished by their horizontal orientation based on their prediction direction. Modes 19 through 33 may be distinguished to be in a negative direction based on the reference sample.

Figure 18:
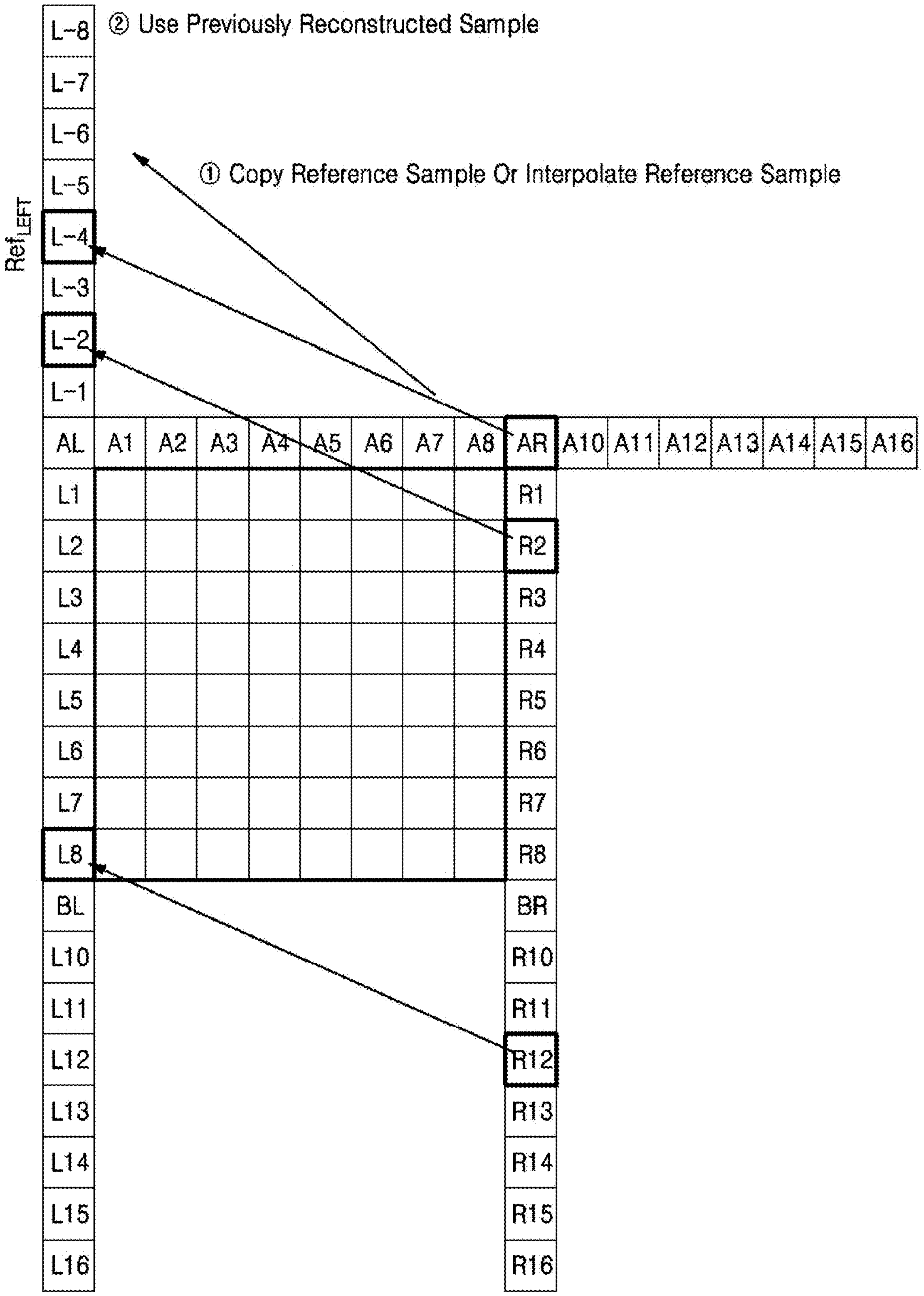
FIG. 18 is a diagram for describing a method of generating and correcting second reference samples for the horizontal and negative angular modes, according to at least one embodiment of the present disclosure.

FIG. 18 is a diagram for describing a method for generating and correcting second reference samples for the horizontal and negative angular modes, according to at least one embodiment of the present disclosure.

Referring to FIG. 18, reference samples AL through A16 adjacent the top of the current block and reference samples L1 through L16 adjacent the left side of the current block may be reconstructed reference samples. R1 through R16 may be second reference samples. R1 through R16 may be generated by performing an intra prediction on the directionality of the intra-prediction mode of the current block. For example, the second reference sample R12 may be generated by using an interpolated value around the first reference sample L8 corresponding to the intra-prediction mode of the current block. For example, the second reference sample R2 may be generated by using an interpolated value around the first reference sample L-2 corresponding to the intra-prediction mode of the current block.

First reference samples L-8 through L-1 may be generated by copying the values of reference samples A1 through A8 adjacent to the top of the current block. For example, the first reference sample L-8 may be generated by copying the value of its corresponding first reference sample A8. For example, the first reference sample L-7 may be generated by copying the value of its corresponding first reference sample A7. For example, the first reference sample L-1 may be generated by copying the value of its corresponding first reference sample A1. The first reference samples L-8 to L-1 may be generated by using interpolated values of the first reference samples adjacent to the top of the current block, corresponding to the respective first reference samples, taking into account the directionality of the intra-prediction mode of the current block. Since the first reference samples L-8 through L-1 reside in a reconstructed region, they may be generated by using the reconstructed sample values corresponding to their locations.

The generated second reference samples may be corrected. There may be two ways to correct the second reference samples. In the first method, a difference may be calculated between the value of the top-right sample AR of the current block and the value of its corresponding first reference sample $Ref_{LEFT}$. By reflecting this difference in the second reference samples, the second reference samples may be corrected. This method may be expressed as $Ri' = Ri + (AR - Ref_{LEFT})$. Here, Ri' may be corrected second reference samples, and Ri may be uncorrected second reference samples. 'i' may be represented by $1 \le i \le$ block size.

In the second method, the difference may be calculated between the value of the top-right sample AR of the current block and the value of its corresponding first reference sample $Ref_{LEFT}$. Based on this difference, and reflecting the distances between AR and the second reference samples to be corrected, the second reference samples may be corrected. This method may be expressed as $Ri' = Ri + (AR - Ref_{LEFT}) >> (i-1)$. The weighting value for the distances between AR and the second reference samples to be corrected may be arbitrarily determined. Ri' may be corrected second reference samples, and Ri may be uncorrected second reference samples. 'i' may be represented by $1 \le i \le$ block size.

Figure 19:
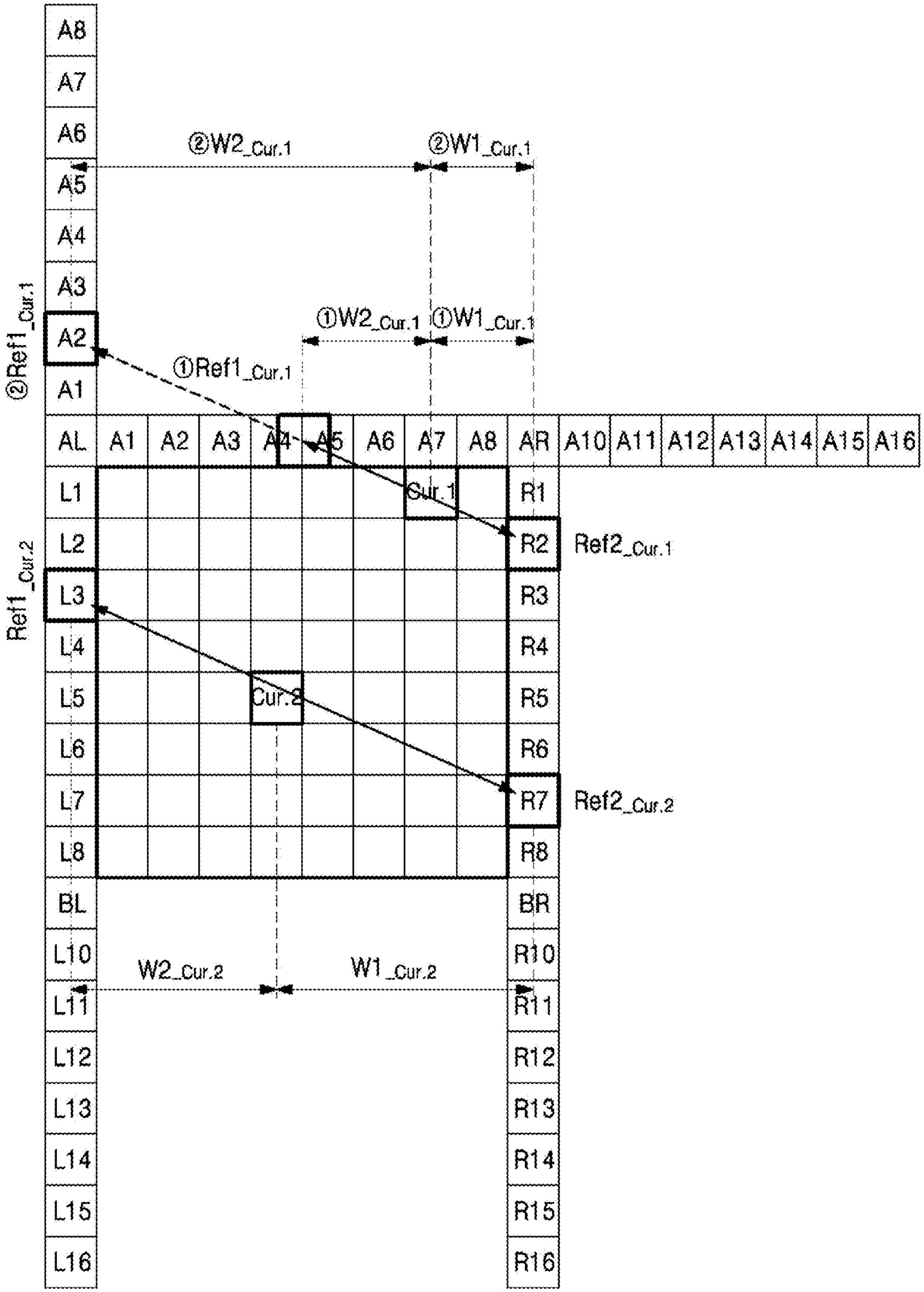
FIG. 19 is a diagram for describing a method of performing bi-directional prediction on horizontal and negative angular modes, according to at least one embodiment of the present disclosure.

FIG. 19 is a diagram for describing a method of performing bi-directional prediction on horizontal and negative angular modes, according to at least one embodiment of the present disclosure.

Referring to FIG. 19, $W1_{\_Cur1}$, $W2_{\_Cur1}$, $W1_{\_Cur2}$, and $W2_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.2 may be generated by linearly interpolating the value of the first reference sample $Ref1_{\_Cur.2}$ with the value of the second reference sample $Ref2_{\_Cur.2}$. This linear interpolation expression may be represented as $Pred\_Cur.2 = W1_{\_Cur.2} \times Ref1_{\_Cur.2} + W2_{\_Cur.2} \times Ref2_{\_Cur.2}$. Additionally, the predicted value of sample Cur.2 may be generated by averaging the value of the first reference sample $Ref1_{\_Cur.2}$ and the value of the second reference sample $Ref2_{\_Cur.2}$. Here, the second reference sample $Ref2_{\_Cur.2}$ may be a corrected value.

The predicted value of sample Cur.1 may be generated in different ways depending on which sample is used as the first reference sample. For example, the predicted value of sample Cur.1 may be generated by linearly interpolating the value of the first reference sample ①$Ref1_{_Cur.1}$ with the value of the second reference sample $Ref2_{_Cur.1}$. This linear interpolation expression may be represented as $Pred\_Cur.1 =$ ①$W1_{_Cur.1} \times$ ①$Ref1_{_Cur.1} +$ ①$W2_{_Cur.1} \times Ref2_{_Cur.1}$. Additionally, the predicted value of sample Cur.1 may be generated by averaging the value of the first reference sample ①$Ref1_{_Cur.1}$ and the value of the second reference sample $Ref2_{_Cur.1}$. Here, the second reference sample $Ref2_{_Cur.1}$ may be a corrected value.

The predicted value of sample Cur.1 may be generated by linearly interpolating the value of the first reference sample ②$Ref1_{_Cur.1}$ with the value of the second reference sample $Ref2_{_Cur.1}$. This linear interpolation expression may be represented as $Pred\_Cur.1 =$ ②$W1_{_Cur.1} \times$ ②$_{_Cur.1} +$ ②$W2_{_Cur.1} \times Ref2_{_Cur.1}$. Additionally, the predicted value of sample Cur.1 may be generated by averaging the value of the first reference sample ②$Ref1_{_Cur.1}$ and the value of the second reference sample $Ref2_{_Cur.1}$. Here, the second reference sample $Ref2_{_Cur.1}$ may be a corrected value. In this way, by generating predicted values for all samples in the current block, a predicted block of the current block may be generated.

Figure 20:
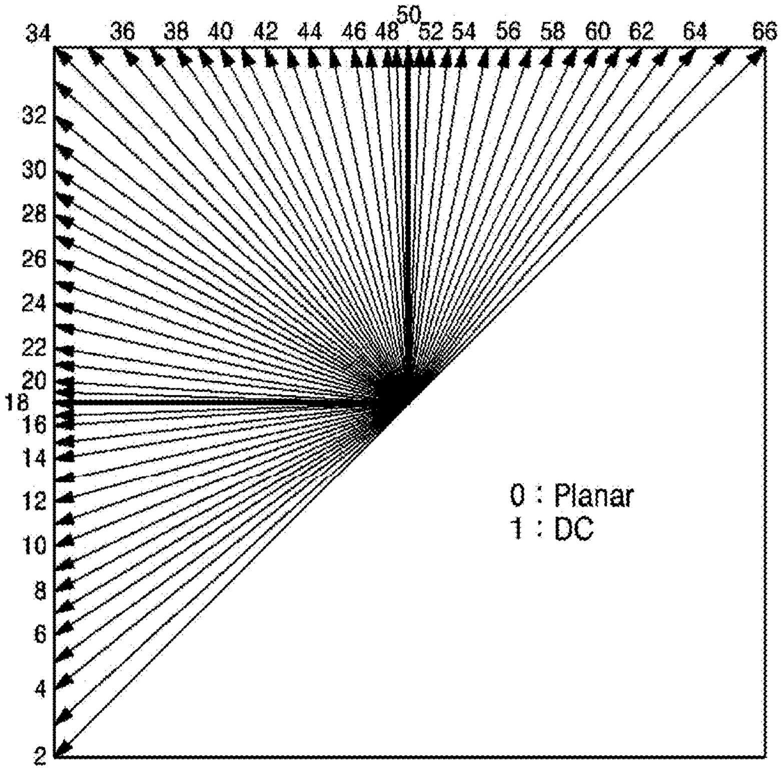
FIG. 20 is a diagram for describing a horizontal mode and a vertical mode, according to at least one embodiment of the present disclosure.

FIG. 20 is a diagram for describing a horizontal mode and a vertical mode, according to at least one embodiment of the present disclosure.

Referring to FIG. 20, the vertical mode may be mode 50. The horizontal mode may be mode 18.

Figure 21A:
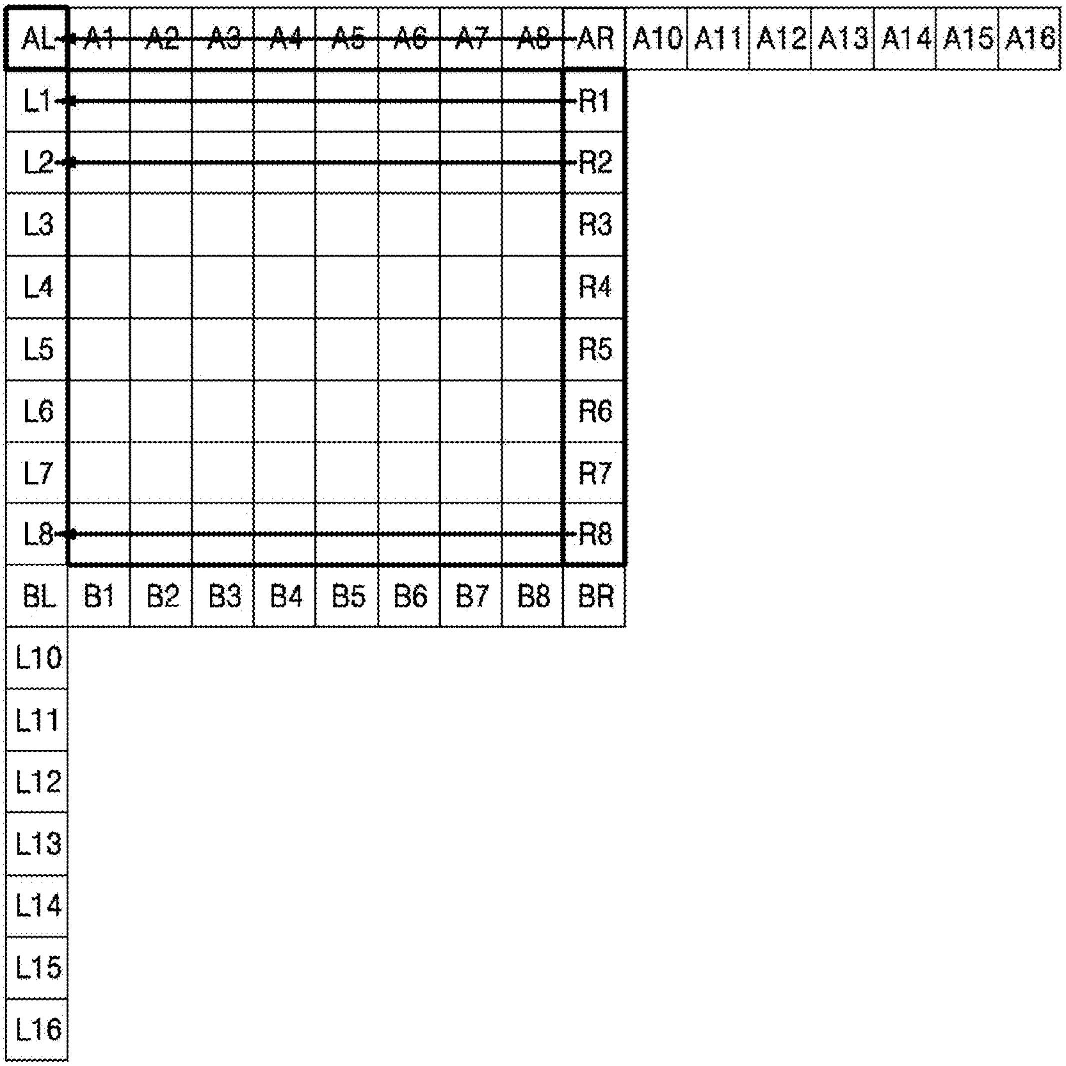
FIGS. 21A and 21B are diagrams for describing methods of generating and correcting second reference samples for the horizontal mode and the vertical mode, respectively, according to at least one embodiment of the present disclosure.
Figure 21B:
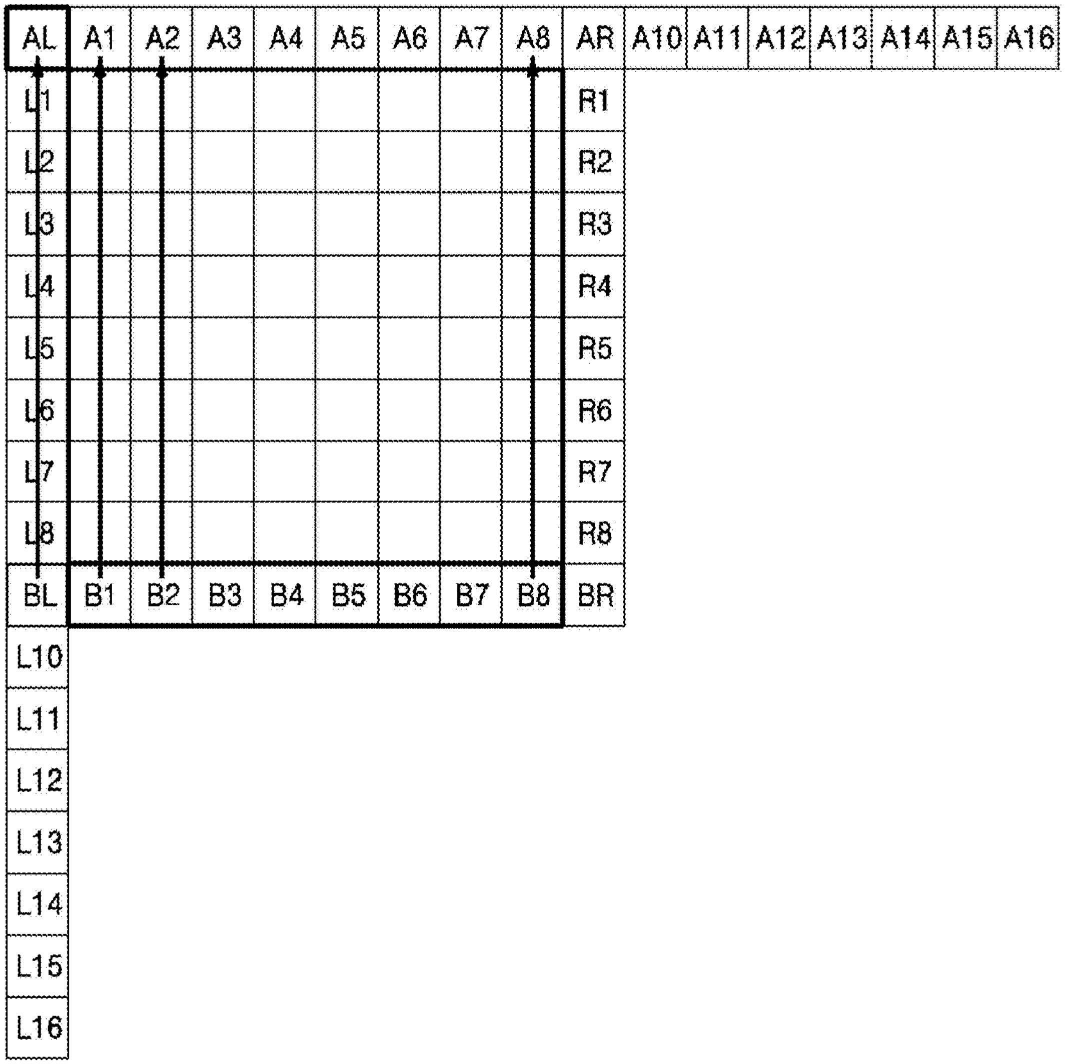

FIGS. 21A and 21B are diagrams for describing methods of generating and correcting second reference samples for the horizontal mode and the vertical mode, respectively, according to at least one embodiment of the present disclosure.

Referring to FIG. 21A, reference samples AL through A16 adjacent to the top of the current block and reference samples L1 through L16 adjacent to the left side of the current block may be reconstructed reference samples. If the intra-prediction mode of the current block is horizontal, R1 through R8 may be the second reference samples. R1 through R8 may be generated by performing an intra prediction on the intra-prediction mode of the current block. R1 to R8 may be generated by using the values of the first reference samples L1 to L8 adjacent to the left of the current block.

The generated second reference samples may be corrected. There may be two ways to correct the second reference samples. In the first method, a difference may be calculated between the value of the top-right sample AR of the current block and the value of its corresponding first reference sample AL. By reflecting this difference in the second reference samples, the second reference samples may be corrected. This method may be expressed as Ri'=Ri+(AR−AL). Here, Ri' may be corrected second reference samples, and Ri may be uncorrected second reference samples. 'i' may be represented by 1≤i≤block size.

In the second method, the difference may be calculated between the value of the top-right sample AR of the current block and the value of its corresponding first reference sample AL. Based on this difference, and reflecting the distances between AR and the second reference samples to be corrected, the second reference samples may be corrected. This method may be expressed as Ri'=Ri+(AR−AL)>>(i-1). The weighting value for the distances between AR and the second reference samples to be corrected may be arbitrarily determined. Ri' may be corrected second reference samples, and Ri may be uncorrected second reference samples. 'i' may be represented by 1≤I≤block size.

Referring to FIG. 21B, reference samples AL through A16 adjacent to the top of the current block and reference samples L1 through L16 adjacent to the left side of the current block may be reconstructed reference samples. If the intra-prediction mode of the current block is vertical, B1 through B8 may be the second reference samples. B1 through B8 may be generated by performing an intra prediction on the intra-prediction mode of the current block. B1 through B8 may be generated by using the values of the first reference samples A1 through A8 adjacent to the top of the current block.

The generated second reference samples may be corrected. There may be two ways to correct the second reference samples. In the first method, a difference may be calculated between the value of the bottom-left sample BL of the current block and the value of its corresponding first reference sample AL. By reflecting this difference in the second reference samples, the second reference samples may be corrected. This method may be expressed as Bi'=Bi+(BL−AL). Here, Bi' may be corrected second reference samples, and Bi may be uncorrected second reference samples. 'i' may be represented by 1≤i≤block size.

In the second method, the difference may be calculated between the value of the bottom-left sample BL of the current block and the value of its corresponding first reference sample AL. Based on this difference, and reflecting the distances between BL and the second reference samples to be corrected, the second reference samples may be corrected. This method may be expressed as Bi'=Bi+(BL−AL)>>(i-1). The weighting value for the distances between BL and the second reference samples to be corrected may be arbitrarily determined. Bi' may be corrected second reference samples, and Bi may be uncorrected second reference samples. 'i' may be represented by 1≤i≤block size.

Figure 22A:
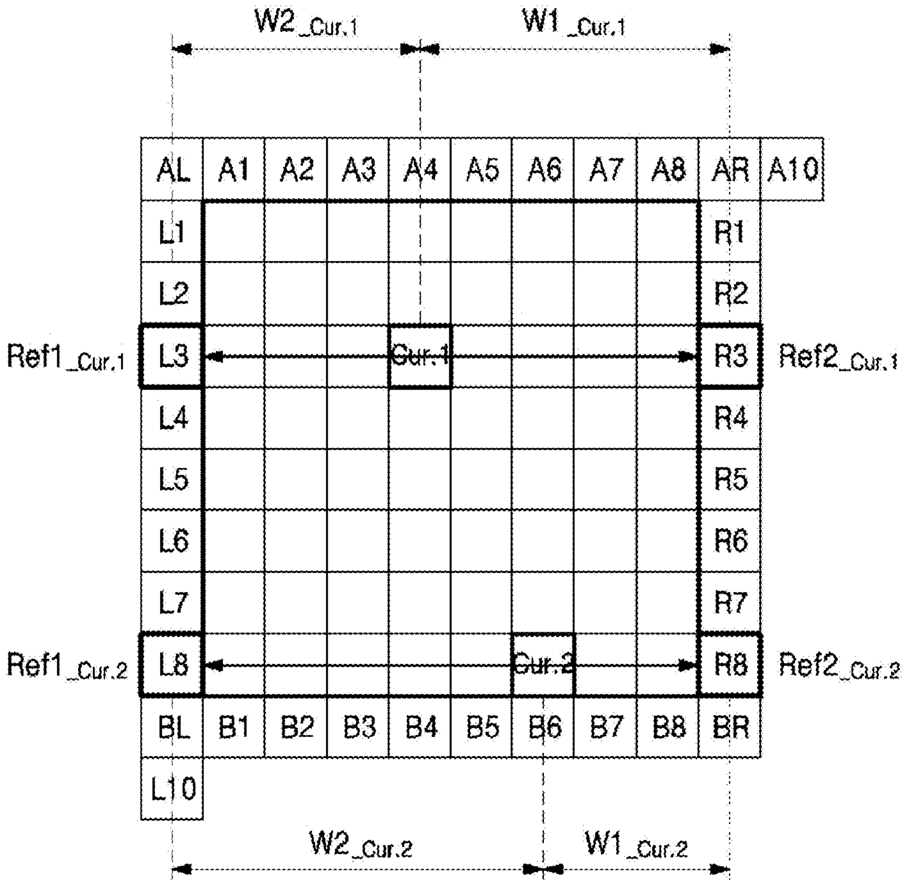
FIGS. 22A and 22B are diagrams for describing bi-directional prediction for horizontal mode and vertical mode, respectively, according to at least one embodiment of the present disclosure.
Figure 22B:
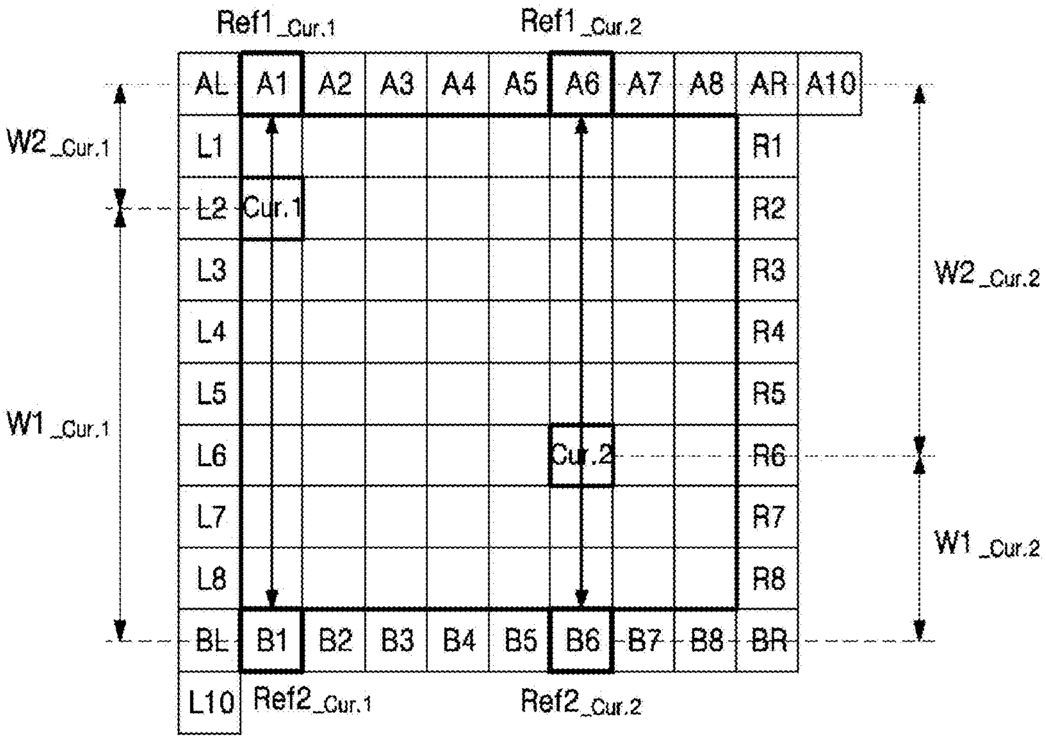

FIGS. 22A and 22B are diagrams for describing bi-directional prediction for horizontal mode and vertical mode, respectively, according to at least one embodiment of the present disclosure.

Referring to FIG. 22A, $W1_{\_Cur1}$, $W2_{\_Cur1}$, $W1_{\_Cur2}$, and $W2_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.1 may be generated by linearly interpolating the value of the first reference sample $Ref1_{_Cur.1}$ with the value of the second reference sample $Ref2_{_Cur.1}$. This linear interpolation expression may be represented as Pred_Cur.1=$W1_{\_Cur.1}\times Ref1_{\_Cur.1}+W2_{\_Cur.1}\times Ref2_{\_Cur.1}$. Additionally, the predicted value of sample Cur.1 may be generated by averaging the value of the first reference sample $Ref1_{_Cur.1}$ and the value of the second reference sample $Ref2_{_Cur.1}$. Here, the value of the second reference sample $Ref2_{_Cur.1}$ may be a corrected value.

For example, the predicted value of sample Cur.2 may be generated by linearly interpolating the value of the first reference sample $Ref1_{\_Cur.2}$ with the value of the second reference sample $Ref2_{\_Cur.2}$. This linear interpolation expression may be represented as Pred_Cur.2=$W1_{\_Cur.2}\times Ref1_{\_Cur.2}+W2_{\_Cur.2}\times Ref2_{\_Cur.2}$. Additionally, the predicted value of sample Cur.2 may be generated by averaging the value of the first reference sample $Ref1_{\_Cur.2}$ and the value of the second reference sample $Ref2_{\_Cur.2}$. Here, the value of the second reference sample $Ref2_{\_Cur.2}$ may be a corrected value. In this way, by generating predicted values for all samples in the current block, a predicted block of the current block may be generated.

Referring to FIG. 22B, $W1_{\_Cur1}$, $W2_{\_Cur1}$, $W1_{\_Cur2}$, and $W2_{\_Cur2}$ may be normalized values reflecting distances corresponding to reference sample Ref1 and reference sample Ref2, respectively, from the current sample. These values may be greater than zero and less than or equal to one. For example, the predicted value of sample Cur.1 may be generated by linearly interpolating the value of the first reference sample $Ref1_{_Cur.1}$ with the value of the second reference sample $Ref2_{_Cur.1}$. This linear interpolation expression may be represented as Pred_Cur.1=$W1_{\_Cur.1}\times Ref1_{\_Cur.1}+W2_{\_Cur.1}\times Ref2_{\_Cur.1}$. Additionally, the predicted value of sample Cur.1 may be generated by averaging the value of the first reference sample $Ref1_{_Cur.1}$ and the value of the second reference sample $Ref2_{_Cur.1}$. Here, the value of the second reference sample $Ref2_{_Cur.1}$ may be a corrected value.

For example, the predicted value of sample Cur.2 may be generated by linearly interpolating the value of the first reference sample $Ref1_{\_Cur.2}$ with the value of the second reference sample $Ref2_{\_Cur.2}$. This linear interpolation expression may be represented as Pred_Cur.2=$W1_{\_Cur.2}\times Ref1_{\_Cur.2}+W2_{\_Cur.2}\times Ref2_{\_Cur.2}$. Additionally, the predicted value of sample Cur.2 may be generated by averaging the value of the first reference sample $Ref1_{\_Cur.2}$ and the value of the second reference sample $Ref2_{\_Cur.2}$. Here, the value of the second reference sample $Ref2_{\_Cur.2}$ may be a corrected value. In this way, by generating predicted values for all samples in the current block, a predicted block of the current block may be generated.

Figure 23:
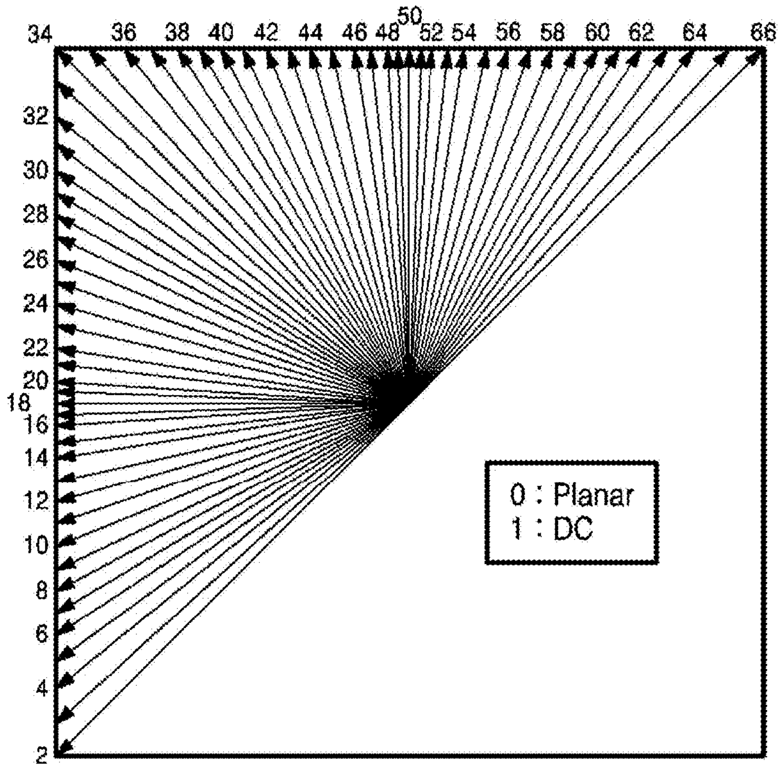
FIG. 23 is a diagram for describing a planar mode and a DC mode, according to at least one embodiment of the present disclosure.

FIG. 23 is a diagram for describing a planar mode and a DC mode, according to at least one embodiment of the present disclosure.

Referring to FIG. 23, the planar mode may be mode 0. The DC mode may be mode 1. The planar mode and the DC mode correspond to non-directional modes.

Figure 24:
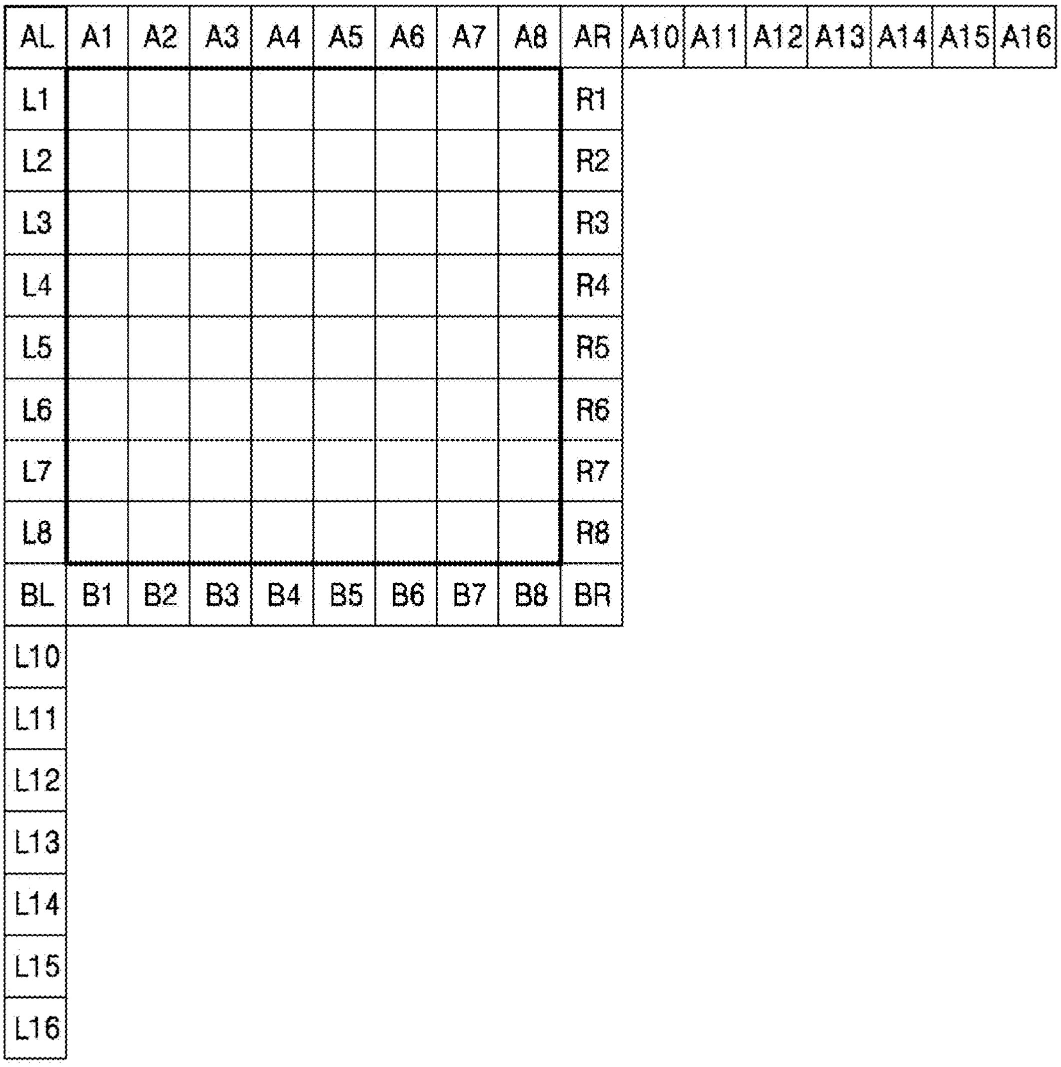
FIG. 24 is a diagram for describing a method of generating and correcting second reference samples for the planar mode and the DC mode, according to at least one embodiment of the present disclosure.

FIG. 24 is a diagram for describing a method of generating and correcting second reference samples for the planar mode and the DC mode, according to at least one embodiment of the present disclosure.

Referring to FIG. 24, reference samples AL through A16 adjacent to the top of the current block and reference samples L1 through L16 adjacent to the left side of the current block may be reconstructed reference samples. If the intra-prediction mode of the current block is planar mode or DC mode, R1 through R8 and B1 through B8 may be the second reference samples. R1 through R8 and B1 through B8 may be generated by performing an intra prediction on the intra-prediction mode of the current block.

The generated second reference samples may be corrected. There may be two ways to correct the second reference samples. In the first method, a difference may be calculated between the value of the top-right sample AR of the current block and the value of its corresponding first reference sample AL. By reflecting this difference in the second reference sample adjacent to the bottom of the current block, the second reference samples may be corrected. This method may be expressed as Bi'=Bi+(AR−AL). Here, Bi' may be corrected second reference samples, and Bi may be uncorrected second reference samples. 'i' may be represented by 1≤i≤block size. A difference may be calculated between the value of the bottom-left sample BL of the current block and the value of its corresponding first reference sample AL. By reflecting this difference in the second reference samples adjacent to the right side of the current block, the second reference samples may be corrected. This method may be expressed as Ri'=Ri+(BL−AL). Here, Ri' may be corrected second reference samples, and Ri may be uncorrected second reference samples. 'i' may be represented by 1≤i≤block size.

In the second method, the difference may be calculated between the value of the top-right sample AR of the current block and the value of its corresponding first reference sample AL. Based on this difference, and reflecting the distances between BL and the second reference samples adjacent to the bottom of the current block to be corrected, second reference samples may be corrected. This method may be expressed as Bi'=Bi+(AR−AL)>>(i-1). The weighting value for the distances between BL and the second reference samples to be corrected may be arbitrarily determined. Bi' may be corrected second reference samples, and Bi may be uncorrected second reference samples. 'i' may be represented by 1≤i≤block size. A difference may be calculated between the value of the lower-left sample BL of the current block and the value of its corresponding first reference sample AL. Based on this difference, and reflecting the distances between AR and the second reference samples adjacent to the right of the current block to be corrected, the second reference samples may be corrected. This method may be expressed as Ri'=Ri+(BL−AL)>>(i-1). The weighting value for the distances between AR and the second reference samples to be corrected may be arbitrarily determined. Ri' may be corrected second reference samples, and Ri may be uncorrected second reference samples. 'i' may be represented by 1≤i≤block size.

Figure 25A:
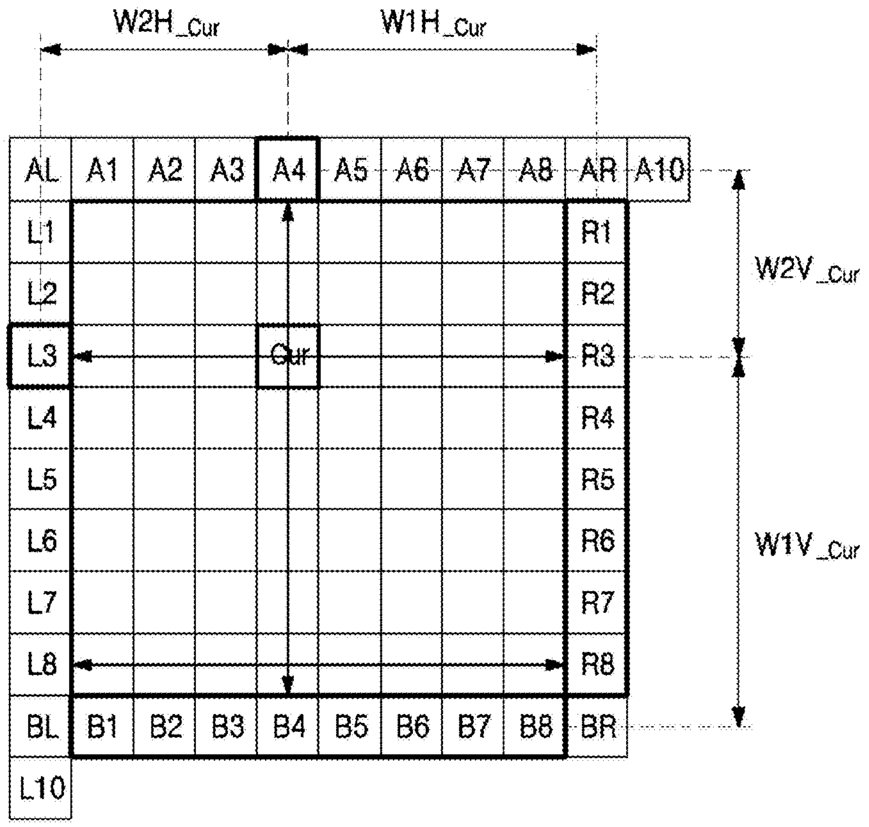
FIGS. 25A and 25B are diagrams for describing bi-prediction for the planar mode and DC mode, according to at least one embodiment of the present disclosure.
Figure 25B:
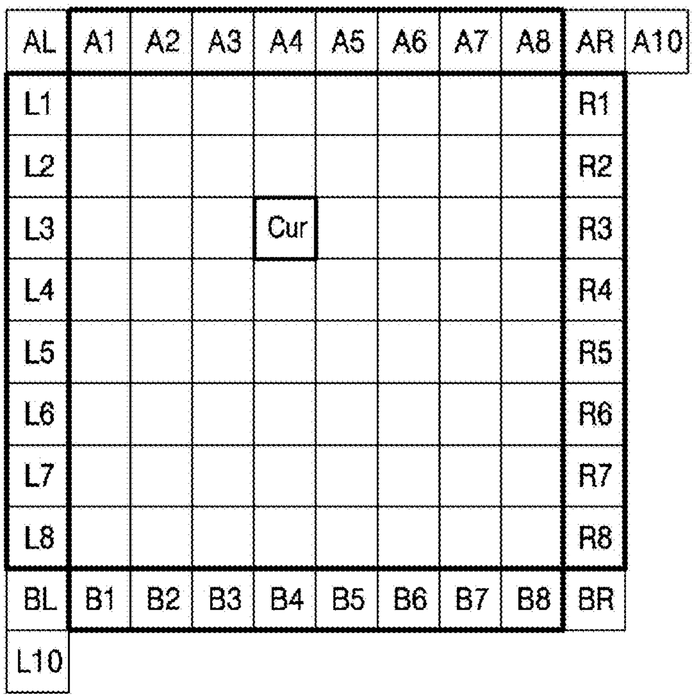

FIGS. 25A and 25B are diagrams for describing bi-prediction for the planar mode and DC mode, according to at least one embodiment of the present disclosure.

Referring to FIG. 25A, $W1H_{\_Cur}$ may be a normalized value reflecting the distance between the current sample and a left reference sample, and $W2H_{\_Cur}$ may be a normalized value reflecting the distance between the current sample and a right reference sample. These normalized values may be greater than zero and less than or equal to one. $W1V_{\_Cur}$ may be a normalized value reflecting the distance between the current sample and a top reference sample, and $W2V_{\_Cur}$ may be a normalized value reflecting the distance between the current sample and a bottom reference sample. These normalized values may be greater than zero and less than or equal to one.

For example, in the planar mode, the predicted value of sample Cur may be generated as the average of a linear interpolation of the value of the first reference sample L3 with the value of the second reference sample R3 and a linear interpolation of the value of the first reference sample A4 with the value of the second reference sample B4. This linear interpolation expression may be represented as Pred_Cur=(($W1H_{_Curx}$L3+$W2H_{_Curx}$R3)+($W1V_{_Curx}$A4+$W2V_{_Curx}$B4)+1)>>1. Additionally, the predicted value of sample Cur may be generated by averaging the value of the first reference sample L3, the value of the second reference sample R3, the value of the first reference sample A4, and the value of the second reference sample B4. Here, the value of the second reference sample R3 and the value of the second reference sample B4 may be corrected values. In this way, by generating predicted values for all samples in the current block, a predicted block of the current block may be generated.

Referring to FIG. 25B, for example, in the DC mode, the predicted value of sample Cur may be generated by averaging the values of the first reference samples L1 through L8, the values of the first reference samples A1 through A8, the values of the second reference samples R1 through R8, and the values of the second reference samples B1 through B8. Further, the predicted value of sample Cur may be generated by selecting, among the first reference sample L1 to L8, the first reference sample A1 to A8, the second reference sample R1 to R8, and the second reference sample B1 to B8, an arbitrary number of specific reference samples in each direction and averaging the selected reference samples. In this way, by generating predicted values for all samples in the current block, a predicted block of the current block may be generated.

Application of Bi-Directional Intra Prediction to Various Intra Prediction Methods Compared to inter prediction, intra prediction may have lower coding efficiency because the amount of information available for use as reference samples is smaller compared to temporally adjacent information. To compensate for the lower coding efficiency of intra prediction, various intra-prediction methods may be used. The various intra-prediction methods may include Intra Sub-Partitions (ISP), Position-Dependent Prediction Combination (PDPC), Multi-Reference Line (MRL), Cross Component Linear Model (CCLM), and Matrix-based Intra Prediction (MIP). The bi-directional intra prediction of the present disclosure may be applied to these intra prediction methods. The bi-directional intra prediction of the present disclosure may be applied to chrominance components as well as luminance components. The bi-directional intra prediction of the present disclosure may be applied to nonsquare blocks as well as square blocks.

Method of Transmitting or Parsing Information on Bi-Directional Intra-Prediction Mode Information indicating whether bi-directional intra-prediction mode is allowed, e.g., bi-prediction_enabled_flag may be signaled in a Video Parameter Set (VPS), Sequence Parameter Set (SPS), Picture Parameter Set (PPS), picture header (PH), or slice header (SH). Information on the bi-directional intra-prediction mode may be signaled in three distinct cases in terms of coding performance and complexity.

First, bi-directional intra-prediction mode may be used for directional modes as well as non-directional modes. When the current block is encoded to enable bi-directional intra-prediction mode, information indicating whether bi-directional intra-prediction mode is enabled (e.g., intra_biprediction_flag) may be transmitted or parsed. After the intra_biprediction_flag is transmitted or parsed, information on the intra-prediction mode of the current block may be transmitted or parsed.

Second, bi-directional intra-prediction mode may be used exclusively for modes included in the Most Probable Mode (MPM) list. After the intra_luma_mpm_flag is transmitted or parsed, the intra_biprediction_flag may be transmitted or parsed only if the intra-prediction mode for the current block is a mode within the MPM list.

Third, bi-directional intra-prediction mode may be used exclusively for directional modes, not non-directional modes. If the intra-prediction mode of the current block is nondirectional, the intra_biprediction_flag may not be transmitted or parsed. Only if the intra-prediction mode of the current block is directional, the intra_biprediction_flag may be transmitted or parsed. When the current block uses the bi-directional intra-prediction mode through these three cases, bi-directional prediction may be performed in the current block's intra-prediction mode. The present disclosure is not limited to these embodiments, and bi-prediction may be performed in various other cases.

Figure 26:
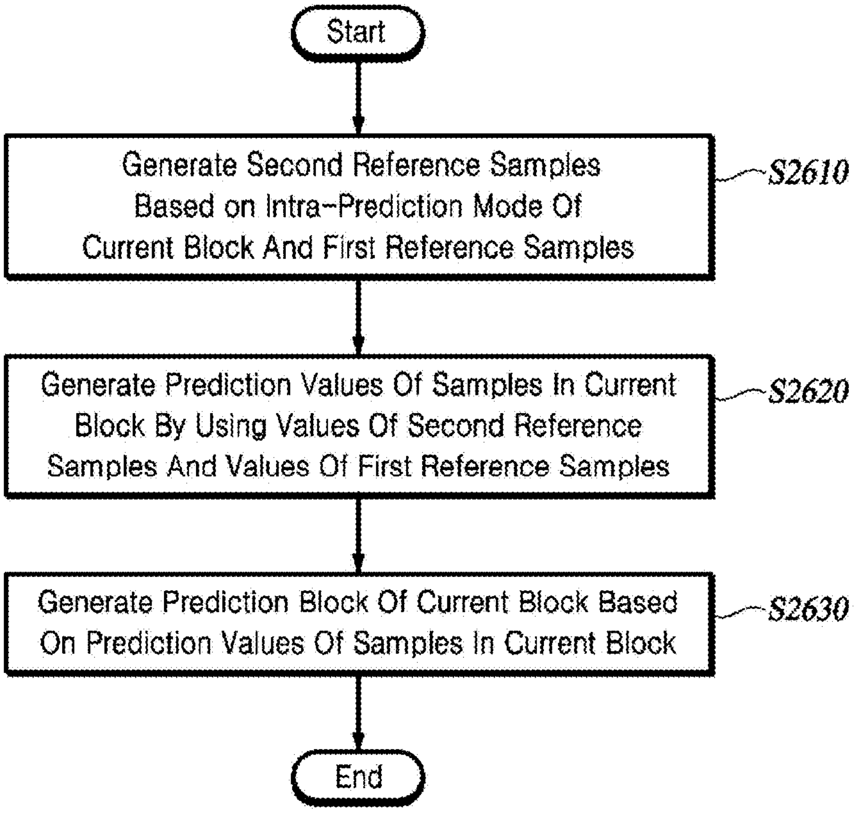
FIG. 26 is a diagram illustrating a video decoding process, according to an embodiment of the present disclosure.

FIG. 26 is a diagram illustrating a video decoding process, according to an embodiment of the present disclosure.

Referring to FIG. 26, the decoding apparatus may generate second reference samples based on the intra-prediction mode of the current block and the first reference samples (S2610). When the intra-prediction mode of the current block is in the first range, this step of generating the second reference samples may include a step of generating reference samples that are adjacent to the bottom side of the current block among the second reference samples based on the intra-prediction mode of the current block and reference samples that are adjacent to the top side and the top-right side of the current block among the first reference samples and a step of generating reference samples that are adjacent to the bottom-left side of the current block among the second reference samples based on at least one of reconstructed samples or reference samples that are adjacent to the left side of the current block among the first reference samples.

When the intra-prediction mode of the current block is in a second range, the step of generating the second reference samples may include a step of generating reference samples that are adjacent to the left side of the current block among the second reference samples based on the intra-prediction mode of the current block and reference samples that are adjacent to the left side and the bottom-left side of the current block among the first reference samples and a step of generating reference samples that are adjacent to the top-left side of the current block among the second reference samples based on at least one of reconstructed samples or reference samples that are adjacent to the top side of the current block among the first reference samples.

When the intra-prediction mode of the current block is in a third range, the step of generating the second reference samples may include a step of generating the second reference samples based on the intra-prediction mode of the current block, reference samples that are adjacent to the top side and the top-right side of the current block among the first reference samples, and reference samples that are adjacent to the top-left side of the current block among the first reference samples. Reference samples that are adjacent to the top-left side of the current block among the first reference samples may be generated based on at least one of the reconstructed samples or reference samples that are adjacent to the left side of the current block among the first reference samples.

When the intra-prediction mode of the current block is in a fourth range, the step of generating the second reference samples may include a step of generating the second reference samples based on the intra-prediction mode of the current block, reference samples that are adjacent to the left side and the bottom-left side of the current block among the first reference samples, and reference samples that are adjacent to the top-left side of the current block among the first reference samples. Reference samples that are adjacent to the top-left side of the current block among the first reference samples may be generated based on at least one of the reconstructed samples or reference samples that are adjacent to the top side of the current block among the first reference samples.

When the intra-prediction mode of the current block is horizontal mode, the step of generating the second reference samples may include a step of generating the second reference samples based on the intra-prediction mode of the current block and reference samples that are adjacent to the left side of the current block among the first reference samples. When the intra-prediction mode of the current block is vertical mode, the step of generating the second reference samples may include a step of generating the second reference samples based on the intra-prediction mode of the current block and reference samples that are adjacent to the top side of the current block among the first reference samples.

When the intra-prediction mode of the current block is planar mode or DC mode, the second reference samples may be samples adjacent to the right side of the current block and samples adjacent to the left side of the current block.

The decoding apparatus may use the values of the second reference samples and the values of the first reference samples to generate prediction values of the samples in the current block (S2620). The step of generating the prediction values of the samples in the current block may include a step of generating the prediction values of samples in the current block based on at least one of the distances between the samples in the current block and the first reference samples, distances between the samples in the current block and the second reference samples, the values of the first reference samples, or the values of the second reference samples.

The decoding apparatus may generate a predicted block of the current block based on the predicted values of the samples in the current block (S2630). The decoding apparatus may correct, before the step of generating the prediction values of the samples in the current block, the values of the second reference samples based on at least one of a sample adjacent to a top-left side of the current block, a sample adjacent to a bottom-left side of the current block, or a sample adjacent to a top-right side of the current block. The decoding apparatus may correct, before the step of generating the prediction values of the samples in the current block, the values of the second reference samples based on one or more reference samples determined according to the intra-prediction mode of the current block.

Figure 27:
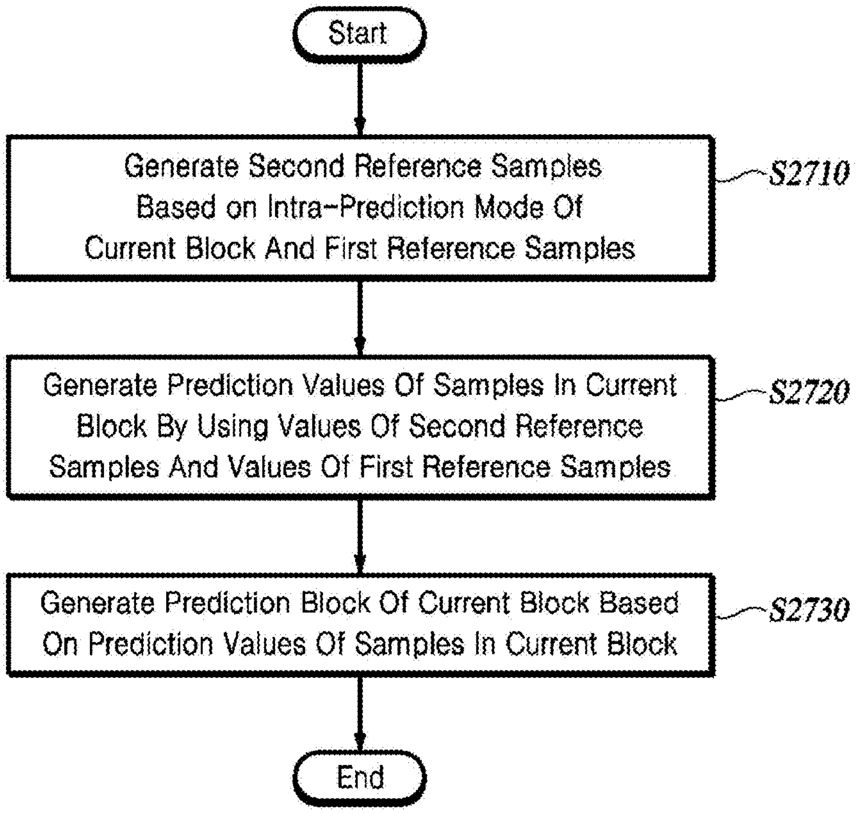
FIG. 27 is a diagram illustrating a video encoding process, according to an embodiment of the present disclosure.

FIG. 27 is a diagram illustrating a video encoding process, according to an embodiment of the present disclosure.

Referring to FIG. 27, the encoding apparatus may generate second reference samples based on the intra-prediction mode of the current block and the first reference samples (S2710). When the intra-prediction mode of the current block is in the first range, the step of generating the second reference samples may include a step of generating reference samples that are adjacent to the bottom side of the current block among the second reference samples based on the intra-prediction mode of the current block and reference samples that are adjacent to the top side and the top-right side of the current block among the first reference samples, and a step of generating reference samples that are adjacent to the bottom-left side of the current block among the second reference samples based on at least one of reconstructed samples or reference samples that are adjacent to the left side of the current block among the first reference samples.

When the intra-prediction mode of the current block is in a second range, the step of generating the second reference samples may include a step of generating reference samples that are adjacent to the left side of the current block among the second reference samples based on the intra-prediction mode of the current block and reference samples that are adjacent to the left side and the bottom-left side of the current block among the first reference samples and a step of generating reference samples that are adjacent to the top-left side of the current block among the second reference samples based on at least one of reconstructed samples or reference samples that are adjacent to the top side of the current block among the first reference samples.

When the intra-prediction mode of the current block is in a third range, the step of generating the second reference samples may include a step of generating the second reference samples based on the intra-prediction mode of the current block, reference samples that are adjacent to the top side and a top-right side of the current block among the first reference samples, and reference samples that are adjacent to the top-left side of the current block among the first reference samples. Reference samples that are adjacent to the top-left side of the current block among the first reference samples may be generated based on at least one of the reconstructed samples or reference samples that are adjacent to the left side of the current block among the first reference samples.

When the intra-prediction mode of the current block is in a fourth range, the step of generating the second reference samples may include a step of generating the second reference samples based on the intra-prediction mode of the current block, reference samples that are adjacent to the left side and a bottom-left side of the current block among the first reference samples, and reference samples that are adjacent to the top-left side of the current block among the first reference samples. Reference samples that are adjacent to the top-left side of the current block among the first reference samples may be generated based on at least one of the reconstructed samples or the first reference samples that are adjacent to the top side of the current block among the first reference samples.

When the intra-prediction mode of the current block is horizontal mode, the step of generating the second reference samples may include a step of generating the second reference samples based on the intra-prediction mode of the current block and the first reference samples that are adjacent to the left side of the current block among the first reference samples. When the intra-prediction mode of the current block is vertical mode, the step of generating the second reference samples may include a step of generating the second reference samples based on the intra-prediction mode of the current block and the first reference samples that are adjacent to the top side of the current block among the first reference samples.

When the intra-prediction mode of the current block is planar mode or DC mode, the second reference samples may be samples adjacent to the right side of the current block and samples adjacent to the left side of the current block.

The encoding apparatus may use the values of the second reference samples and the values of the first reference samples to generate prediction values of the samples in the current block (S2720). The step of generating the prediction values of the samples in the current block may include a step of generating the prediction values of samples in the current block based on at least one of the distances between the samples in the current block and the first reference samples, distances between the samples in the current block and the second reference samples, the values of the first reference samples, or the values of the second reference samples.

The encoding apparatus may generate a prediction block of the current block based on the prediction values of the samples in the current block (S2730). The encoding apparatus may correct, before the generating of the prediction values of the samples in the current block, the values of the second reference samples based on at least one of a sample adjacent to the top-left side of the current block, a sample adjacent to the bottom-left side of the current block, or a sample adjacent to the top-right side of the current block. The encoding apparatus may correct, before the generating of the prediction values of the samples in the current block, the values of the second reference samples based on one or more reference samples determined according to the intra-prediction mode of the current block.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

What is claimed is:

1. A video decoding method, comprising:

generating second reference samples based on an intra-prediction mode of a current block and first reference samples adjacent to left and top sides of the current block;

correcting values of the second reference samples based on difference values between the first reference samples and at least one of a sample adjacent to a bottom-left side of the current block or a sample adjacent to a top right side of the current block;

generating prediction values of current samples in the current block by using values of the first reference samples and the values of the second reference samples; and generating a prediction block of the current block based on the prediction values of the current samples in the current block.

2. A video encoding method, comprising:

generating second reference samples based on an intra-prediction mode of a current block and first reference samples adjacent to left and top sides of the current block;

correcting values of the second reference samples based on difference values between the first reference samples and at least one of a sample adjacent to a bottom-left side of the current block, or a sample adjacent to a top right side of the current block, generating prediction values of current samples in the current block by using values of the first reference samples and the values of a second reference samples; and generating a prediction block of the current block based on the prediction values of the current samples in the current block.

3. A method for transmitting a bitstream associated with video data, the method comprising:

generating the bitstream by encoding the video data; and transmitting the bitstream to a video decoding apparatus, wherein generating the bitstream comprises:

generating second reference samples based on an intra-prediction mode of a current block and first reference samples adjacent to left and top sides of the current block;

correcting values of the second reference samples based on difference values between the first reference samples and at least one of a sample adjacent to a bottom-left side of the current block, or a sample adjacent to a top right side of the current block;

generating prediction values of current samples in the current block by using values of the first reference samples and the values of the second reference samples; and generating a prediction block of the current block based on the prediction values of the current samples in the current block.

4. The video decoding method of claim 1, wherein, when the intra-prediction mode of the current block is in a first range, generating the second reference samples comprises:

generating reference samples that are adjacent to a bottom side of the current block among the second reference samples based on the intra-prediction mode of the current block and reference samples that are adjacent to a top side and a top-right side of the current block among the first reference samples; and generating reference samples that are adjacent to a bottom-left side of the current block among the second reference samples based on at least one of reconstructed samples or reference samples that are adjacent to a left side of the current block among the first reference samples.

5. The video decoding method of claim 1, wherein, when the intra-prediction mode of the current block is in a second range, generating the second reference samples comprises:

generating reference samples that are adjacent to a left side of the current block among the second reference samples based on the intra-prediction mode of the current block and reference samples that are adjacent to the left side and a bottom-left side of the current block among the first reference samples; and generating reference samples that are adjacent to a top-left side of the current block among the second reference samples based on at least one of reconstructed samples or reference samples that are adjacent to a top side of the current block among the first reference samples.

6. The video decoding method of claim 1, wherein, when the intra-prediction mode of the current block is in a third range, generating the second reference samples comprises:

generating the second reference samples based on the intra-prediction mode of the current block, reference samples that are adjacent to a top side and a top-right side of the current block among the first reference samples, and reference samples that are adjacent to a top-left side of the current block among the first reference samples, and wherein reference samples that are adjacent to a top-left side of the current block among the first reference samples are generated based on at least one of reconstructed samples or reference samples that are adjacent to a left side of the current block among the first reference samples.

7. The video decoding method of claim 1, wherein, when the intra-prediction mode of the current block is in a fourth range, generating the second reference samples comprises:

generating the second reference samples based on the intra-prediction mode of the current block, reference samples that are adjacent to a left side and a bottom-left side of the current block among the first reference samples, and reference samples that are adjacent to a top-left side of the current block among the first reference samples, and wherein, reference samples that are adjacent to a top-left side of the current block among the first reference samples are generated based on at least one of reconstructed samples or reference samples that are adjacent to a top side of the current block among the first reference samples.

8. The video decoding method of claim 1, wherein, when the intra-prediction mode of the current block is a horizontal mode, generating the second reference samples comprises:

generating the second reference samples based on the intra-prediction mode of the current block and reference samples that are adjacent to a left side of the current block among the first reference samples.

9. The video decoding method of claim 1, wherein, when the intra-prediction mode of the current block is a vertical mode, generating the second reference samples comprises:

generating the second reference samples based on the intra-prediction mode of the current block and reference samples that are adjacent to a top side of the current block among the first reference samples.

10. The video decoding method of claim 1, wherein, generating the prediction values of the samples in the current block comprises:

generating the prediction values of samples in the current block based on at least one of distances between the samples in the current block and the first reference samples, distances between the samples in the current block and the second reference samples, the values of the first reference samples, or the values of the second reference samples.

11. The video decoding method of claim 1, wherein, when the intra-prediction mode of the current block is a planar mode or a direct current (DC) mode, the second reference samples are samples adjacent to a right side of the current block and samples adjacent to a left side of the current block.

12. The video encoding method of claim 2, wherein, when the intra-prediction mode of the current block is in a first range, generating the second reference samples comprises:

generating reference samples that are adjacent to a bottom side of the current block among the second reference samples based on the intra-prediction mode of the current block and reference samples that are adjacent to a top side and a top-right side of the current block among the first reference samples; and generating reference samples that are adjacent to a bottom-left side of the current block among the second reference samples based on at least one of reconstructed samples or reference samples that are adjacent to a left side of the current block among the first reference samples.

13. The video encoding method of claim 2, wherein, when the intra-prediction mode of the current block is in a second range, generating the second reference samples comprises:

generating reference samples that are adjacent to a left side of the current block among the second reference samples based on the intra-prediction mode of the current block and reference samples that are adjacent to the left side and a bottom-left side of the current block among the first reference samples; and generating reference samples that are adjacent to a top-left side of the current block among the second reference samples based on at least one of reconstructed samples or reference samples that are adjacent to a top side of the current block among the first reference samples.

14. The video encoding method of claim 2, wherein, when the intra-prediction mode of the current block is in a third range, generating the second reference samples comprises:

generating the second reference samples based on the intra-prediction mode of the current block, reference samples that are adjacent to a top side and a top-right side of the current block among the first reference samples, and reference samples that are adjacent to a top-left side of the current block among the first reference samples, and wherein reference samples that are adjacent to a top-left side of the current block among the first reference samples are generated based on at least one of reconstructed samples or reference samples that are adjacent to a left side of the current block among the first reference samples.

15. The video encoding method of claim 2, wherein, when the intra-prediction mode of the current block is in a fourth range generating the second reference samples comprises:

generating the second reference samples based on the intra-prediction mode of the current block, reference samples that are adjacent to a left side and a bottom-left side of the current block among the first reference samples, and reference samples that are adjacent to a top-left side of the current block among the first reference samples, and wherein, reference samples that are adjacent to a top-left side of the current block among the first reference samples are generated based on at least one of reconstructed samples or reference samples that are adjacent to a top side of the current block among the first reference samples.

16. The video encoding method of claim 2, wherein, when the intra-prediction mode of the current block is a horizontal mode, generating the second reference samples comprises:

generating the second reference samples based on the intra-prediction mode of the current block and reference samples that are adjacent to a left side of the current block among the first reference samples.

17. The video encoding method of claim 2, wherein, when the intra-prediction mode of the current block is a vertical mode, generating the second reference samples comprises:

generating the second reference samples based on the intra-prediction mode of the current block and reference samples that are adjacent to a top side of the current block among the first reference samples.

18. The video encoding method of claim 2, wherein, generating the prediction values of the samples in the current block comprises:

generating the prediction values of samples in the current block based on at least one of distances between the samples in the current block and the first reference samples, distances between the samples in the current block and the second reference samples, the values of the first reference samples, or the values of the second reference samples.

* * * * *